(12) United States Patent
Park et al.

(10) Patent No.: US 11,990,995 B2
(45) Date of Patent: May 21, 2024

(54) METHOD AND APPARATUS FOR REPETITION-BASED DATA TRANSMISSION FOR NETWORK COOPERATIVE COMMUNICATION

(71) Applicant: Samsung Electronics Co., Ltd., Suwon-si (KR)

(72) Inventors: Jinhyun Park, Suwon-si (KR); Hoondong Noh, Suwon-si (KR); Jinkyu Kang, Suwon-si (KR); Taehan Bae, Suwon-si (KR); Heecheol Yang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 17/492,350

(22) Filed: Oct. 1, 2021

(65) Prior Publication Data

US 2022/0029737 A1   Jan. 27, 2022

Related U.S. Application Data

(63) Continuation of application No. 16/833,265, filed on Mar. 27, 2020, now Pat. No. 11,139,912.

(30) Foreign Application Priority Data

Mar. 29, 2019  (KR) .................. 10-2019-0037314
May 3, 2019    (KR) .................. 10-2019-0052384
Sep. 6, 2019   (KR) .................. 10-2019-0110942

(51) Int. Cl.
*H04L 1/00*   (2006.01)
*H04B 7/024*  (2017.01)
*H04L 5/00*   (2006.01)

(52) U.S. Cl.
CPC ............ *H04L 1/0031* (2013.01); *H04B 7/024* (2013.01); *H04L 1/0027* (2013.01);
(Continued)

(58) Field of Classification Search
CPC ... H04L 1/0031; H04L 1/0027; H04L 1/0038; H04L 1/0057; H04L 5/001; H04L 5/0035; H04L 5/0044; H04L 5/0094; H04B 7/024
See application file for complete search history.

(56) References Cited

U.S. PATENT DOCUMENTS 10,219,265 B2   2/2019   You et al.
10,575,205 B2   2/2020   Chen et al.
(Continued)

FOREIGN PATENT DOCUMENTS

CN   101682470 A   3/2010
CN   107211234 A   9/2017
(Continued)

OTHER PUBLICATIONS

Supplementary European Search Report dated Mar. 17, 2022, in connection with European Application No. 20783417.7, 13 pages.
(Continued)

*Primary Examiner* — Janice N Tieu

(57) ABSTRACT

A method by a user equipment (UE) in a wireless communication system includes: receiving a first physical downlink shared channel (PDSCH) transmission and a second PDSCH transmission that carry a same transport block (TB) and are associated with a first transmission configuration indicator (TCI) state and a second TCI state, respectively; determining a transport block size (TBS) of the first PDSCH transmission; and determining low-density parity-check (LDPC) base graph corresponding to the transport block based on the determined TBS for each of the first PDSCH transmission and the second PDSCH transmission, wherein the deter-
(Continued)

mined TBS of the first PDSCH transmission is applied to the second PDSCH transmission.

14 Claims, 19 Drawing Sheets

(52) U.S. Cl.
CPC .......... *H04L 1/0038* (2013.01); *H04L 1/0057* (2013.01); *H04L 5/001* (2013.01); *H04L 5/0035* (2013.01); *H04L 5/0044* (2013.01); *H04L 5/0094* (2013.01)

(56) References Cited

U.S. PATENT DOCUMENTS

| | | |
|---|---|---|
| 11,206,655 B2 | 12/2021 | Moon et al. |
| 2008/0313521 A1 | 12/2008 | Frederiksen et al. |
| 2019/0037437 A1 | 1/2019 | Sun et al. |
| 2019/0045390 A1 | 2/2019 | Davydov et al. |
| 2020/0092068 A1* | 3/2020 | Yang ................. H04W 72/0446 |
| 2020/0245272 A1 | 7/2020 | Hong et al. |
| 2020/0267747 A1 | 8/2020 | Nammi |
| 2020/0358557 A1 | 11/2020 | Park et al. |
| 2021/0160826 A1* | 5/2021 | Bae ........................ H04W 72/23 |
| 2021/0400646 A1* | 12/2021 | Horiuchi ............... H04L 1/1861 |
| 2022/0085939 A1* | 3/2022 | Mondal ................. H04L 5/0048 |

FOREIGN PATENT DOCUMENTS

| | | |
|---|---|---|
| WO | 2016018079 A1 | 2/2016 |
| WO | 2019/038698 A1 | 2/2019 |
| WO | 2019031850 A1 | 2/2019 |
| WO | 2019231561 A1 | 12/2019 |

OTHER PUBLICATIONS

Examination Report dated Mar. 21, 2022, in connection with Indian Application No. 202117044894, 6 pages.
Huawei, et al., "Feature Summary of Enhancements on Multi-TRP/Panel Transmission," R1-1911425, 3GPP TSG RAN WG1 Meeting #98bis, Chongqing, China, Oct. 14-20, 2019, 100 pages.
Qualcomm Incorporated, "TBS and Base-graph Determination," R1-1720699, 3GPP TSG RAN WG1 Meeting 91, Reno, USA, Nov. 27-Dec. 1, 2017, 10 pages.
Samsung, "Enhancements on Multi-TRP/Panel Transmission," R1-1910493, 3GPP TSG RAN WG1 Meeting #98bis, Chongqing, China, Oct. 14-20, 2019, 17 pages.
Nokia et al., "Enhancements on Multi-TRP/Panel Transmission", 3GPP TSG RAN WG1 #96 Meeting, Feb. 25-Mar. 1, 2019, R1-1902563, 17 pages.
ZTE, "Enhancements on Multi-TRP/Panel transmission", 3GPP TSG RAN WG1 #96, Feb. 25-Mar. 1, 2019, R1-1901634, 19 pages.
Notification of Transmittal of the International Search Report and the Written Opinion of the International Searching Authority, or the Declaration dated Jul. 2, 2020 in connection with International Patent Application No. PCT/KR2020/004218, 10 pages.
Naveen Chelikani, "5G-NR DL-SCH LDPC Channel Coding Base Graph selection and Coding Procedure", retrieved on Mar. 11, 2021, published on Dec. 16, 2019, 9 pages.
Grounds of Rejection dated Aug. 11, 2023, in connection with Korean Application No. 10-2019-0110942, 10 pages.
The First Office Action dated Sep. 28, 2023, in connection with Chinese Application No. 202080025782.8, 17 pages.
Communication under Rule 71(3) EPC dated Jan. 24, 2024, in connection with European Patent Application No. 20783417.7, 88 pages.

* cited by examiner

FIG. 14
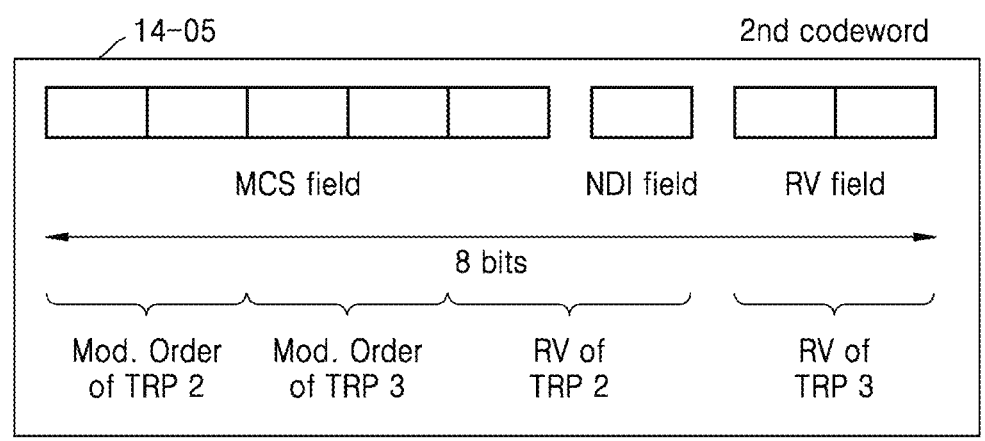
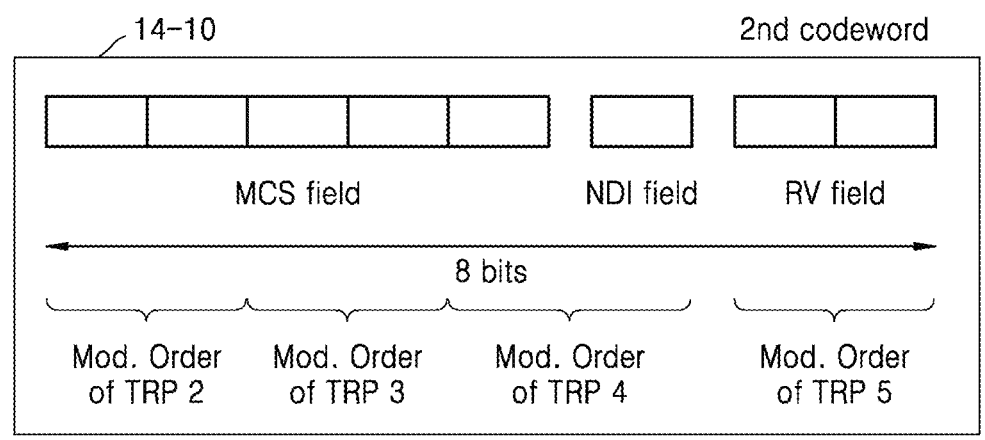

METHOD AND APPARATUS FOR REPETITION-BASED DATA TRANSMISSION FOR NETWORK COOPERATIVE COMMUNICATION

CROSS-REFERENCE TO RELATED APPLICATIONS

This application is a continuation of U.S. patent application Ser. No. 16/833,265 filed on Mar. 27, 2020, which is based on and claims priority under 35 U.S.C. § 119 to Korean Patent Application No. 10-2019-0037314 filed on Mar. 29, 2019, Korean Patent Application No. 10-2019-0052384 filed on May 3, 2019, and Korean Patent Application No. 10-2019-0110942 filed on Sep. 6, 2019 in the Korean Intellectual Property Office, the disclosures of which are herein incorporated by reference in their entirety.

BACKGROUND

1. Field

The disclosure relates to a wireless communication system, and more particularly, to a method and apparatus for repeatedly transmitting/receiving the same data in a wireless communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called "beyond 4G network" communication systems or "post long term evolution (post-LTE)" systems. To achieve high data rates, implementation of 5G communication systems in an ultra-high frequency millimeter-wave (mmWave) band (e.g., a 60 GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

As described above, with the development of wireless communication systems, a data transmitting/receiving method for cooperative communication is required.

SUMMARY

A method and apparatus for repeatedly transmitting the same data between a plurality of transmission nodes and a terminal for network cooperative communication (network coordination) is provided in a wireless communication system.

Additional aspects will be set forth in part in the description which follows and, in part, will be apparent from the description, or may be learned by practice of the presented embodiments of the disclosure.

According to an embodiment of the disclosure, a method by a user equipment (UE) in a wireless communication system includes: receiving a first physical downlink shared channel (PDSCH) transmission and a second PDSCH transmission that carry a same transport block (TB) and are associated with a first transmission configuration indicator (TCI) state and a second TCI state, respectively; determining a transport block size (TBS) of the first PDSCH transmission; and determining low-density parity-check (LDPC) base graph corresponding to the transport block based on the determined TBS for each of the first PDSCH transmission and the second PDSCH transmission, wherein the determined TBS of the first PDSCH transmission is applied to the second PDSCH transmission.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 14 illustrates an example of redefinition of a DCI payload in repeated transmission of multiple TRPs in a wireless communication system according to an embodiment of the disclosure;

DETAILED DESCRIPTION

Figure 1:
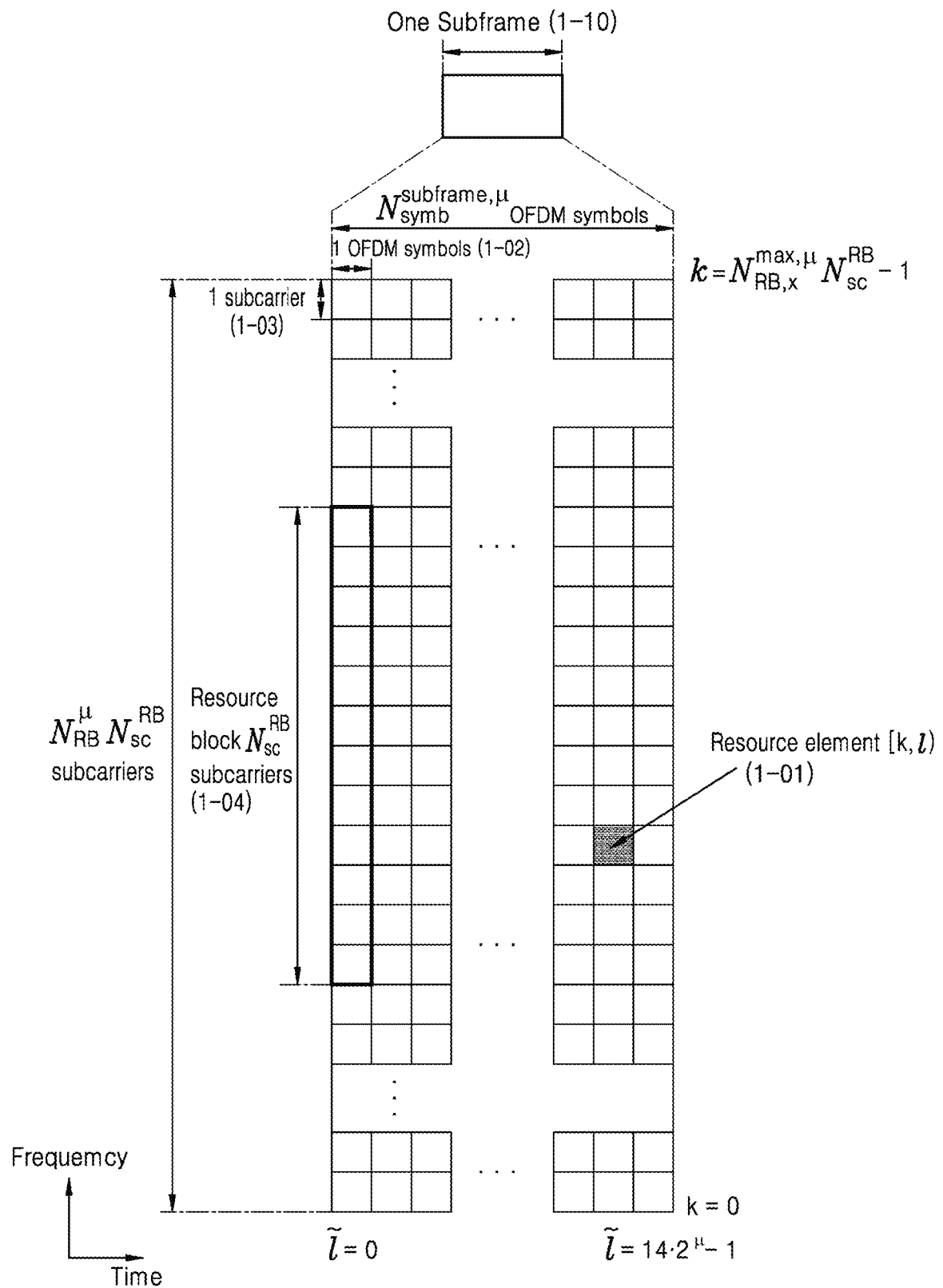
FIG. 1 illustrates a time-frequency domain transmission structure of a long term evolution (LTE) or evolved universal terrestrial radio access (E-UTRA), LTE-advanced (LTE-A), new radio (NR), or similar wireless communication system.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing the embodiments of the disclosure, descriptions of technical contents that are well known in the technical field to which the disclosure belongs and are not directly related to the disclosure will be omitted. This is to more clearly convey the subject matter of the disclosure without obscuration thereof by omitting unnecessary descriptions thereof.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

Advantages and features of the disclosure and methods of achieving the same will be apparent from the embodiments of the disclosure described below in detail with reference to the accompanying drawings. The disclosure may, however, be embodied in many different forms and should not be construed as being limited to the embodiments of the disclosure described below; rather, these embodiments are provided to complete the disclosure and fully convey the scope of the disclosure to those of ordinary skill in the art and the disclosure will be defined only by the scope of the claims. Like reference numerals refer to like elements throughout the specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "— unit" used in the present embodiment of the disclosure may refer to a software component or a hardware component such as a field programmable gate array (FPGA) or an application specific integrated circuit (ASIC) and the "~ unit" may perform certain functions. However, the "~ unit" is not limited to software or hardware. The "~ unit" may be configured to be in an addressable storage medium or may be configured to operate one or more processors. Thus, according to an embodiment of the disclosure, the "~ unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~ units" may be associated with the smaller number of components and "— units" or may be further divided into additional components and "~ units." In addition, the components and "~ units" may be implemented to operate one or more central processing units (CPUs) in a device or a security multimedia card. Also, according to an embodiment of the disclosure, the "~ unit" may include one or more processors.

Hereinafter, operation principles of the disclosure will be described in detail with reference to the accompanying drawings. In the following description of the disclosure, detailed descriptions of well-known functions or configurations will be omitted because they would unnecessarily obscure the subject matters of the disclosure. Also, terms to be described below may be terms defined considering functions in the disclosure and may vary according to users' or operators' intentions or practices. Therefore, the definition thereof should be made based on the contents throughout the specification. Hereinafter, a base station may be an agent performing terminal resource allocation and may be at least one of a gNode B, an eNode B, a Node B, a base station (BS), a radio access unit, a base station controller, or a node on a network. Examples of a terminal may include a user equipment (UE), a mobile station (MS), a cellular phone, a smartphone, a computer, or a multimedia system capable of performing a communication function. However, the disclosure is not limited thereto.

Hereinafter, the disclosure provides technology for a terminal to receive broadcast information from a base station in a wireless communication system. The disclosure relates to a communication method and system for convergence of $5^{th}$ generation (5G) communication systems and Internet of things (IoT) technology to support higher data rates after $4^{th}$ generation (4G) communication systems. The disclosure is applicable to intelligent services (e.g., smart home, smart building, smart city, smart car or connected car, health care, digital education, retail, security, and safety services) based on 5G communication technology and IoT technology.

In the following description, terms referring to broadcast information, terms referring to control information, terms related to communication coverage, terms referring to state changes (e.g., events), terms referring to network entities, terms referring to messages, terms referring to components of an apparatus, and the like are illustrated for convenience of description. Thus, the disclosure is not limited to the terms described below and other terms having equivalent technical meanings may be used.

In the following description, terms and names defined in the $3^{rd}$ generation partnership project long term evolution (3GPP LTE) standards may be used for convenience of description. However, the disclosure is not limited to those terms and names and is equally applicable to systems according to other standards.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink and employs single carrier-frequency division multiple access (SC-FDMA) for an uplink. The uplink refers to a radio link for transmitting data or a control signal from a terminal (e.g., a user equipment (UE) or a mobile station (MS)) to a base station (e.g., an evolved Node B (eNB) or a base station (BS)), and the downlink refers to a radio link for transmitting data or a control signal from the base station to the terminal. The above-described multiple access schemes distinguish between data or control information of different users by allocating time-frequency resources for the data or control information of the users not to overlap each other, that is, to achieve orthogonality therebetween.

As post-LTE systems, 5G systems need to support services capable of reflecting and satisfying various requirements of users, service providers, and the like. Services considered for the 5G systems include enhanced mobile broadband (eMBB), massive machine-type communication (mMTC), and ultra-reliability low-latency communication (URLLC) services.

According to an embodiment of the disclosure, the eMBB aims to provide an improved data rate than the data rate supported by the existing LTE, LTE-A, or LTE-Pro. For example, in a 5G communication system, the eMBB may be able to provide a peak data rate of 20 Gbps in a downlink and a peak data rate of 10 Gbps in an uplink from the viewpoint of a base station. Simultaneously, it is necessary to provide an increased user-perceived data rate of a terminal. In order to satisfy such requirements, there is a need for an improvement in transmission/reception technology including an improved multiple-input multiple-output (MIMO) transmission technology. Also, the data rate required in the 5G communication system may be satisfied by using a frequency bandwidth wider than 20 MHz in the 3 GHz to 6 GHz or 6 GHz or more frequency band, instead of the 2 GHz band used by the current LTE.

Simultaneously, the mMTC is being considered to support application services such as Internet of Thing (IoT) in 5G communication systems. In order to efficiently provide the IoT, the mMTC may require the support for access of a large terminal in a cell, improved terminal coverage, improved battery time, reduced terminal cost, and the like. Because the IoT is attached to various sensors and various devices to provide a communication function, it may be able to support a large number of terminals (e.g., 1,000,000 terminals/km$^2$) in a cell. Also, because a terminal supporting the mMTC is likely to be located in a shadow region failing to be covered by the cell, such as the basement of a building, due to the characteristics of the service, it may require wider coverage than other services provided by the 5G communication systems. The terminal supporting the mMTC may be configured as a low-cost terminal and may require a very long battery life time because it is difficult to frequently replace the battery of the terminal.

Lastly, the URLLC may provide communications providing ultra-low latency and ultra reliability, as services for remote control of robots or machinery, industrial automation, unmanned aerial vehicles, remote health care, emergency alerts, and the like, as cellular-based wireless communication services used for mission-critical purposes. For example, a service supporting the URLLC may satisfy an air interface latency of less than 0.5 milliseconds and simultaneously has a requirement for a packet error rate of $10^{-5}$ or less. Thus, for the service supporting the URLLC, the 5G system may provide a smaller transmit time interval (TTI) than other services and simultaneously has a design requirement for allocating wide resources in a frequency band. However, the above-described mMTC, URLLC, and eMBB are merely examples of different service types, and the service types to which the disclosure is applied are not limited thereto.

The above-described services considered in the 5G communication systems may be provided in a converged manner with each other based on one framework. That is, for efficient resource management and control, respective services may be integrated, controlled, and transmitted as one system rather than operated independently.

Also, although embodiments of the disclosure will be described below by using an LTE, LTE-A, LTE Pro, or NR system as an example, the embodiments of the disclosure may also be applied to other communication systems having similar technical backgrounds or channel forms. Also, the embodiments of the disclosure may also be applied to other communication systems through some modifications without departing from the scope of the disclosure by the judgment of those of ordinary skill in the art.

The disclosure relates to a method and apparatus for repeatedly transmitting data and control signals between a terminal and a plurality of transmission nodes performing cooperative communication to improve communication reliability.

According to the disclosure, when network cooperative communication is used in a wireless communication system, the reliability of terminal reception data/control signals may be improved.

Hereinafter, a frame structure of the 5G system will be described in more detail with reference to the accompanying drawings. FIG. 1 is a diagram illustrating a time-frequency domain transmission structure of an LTE, LTE-A, NR, or similar wireless communication system.

FIG. 1 illustrates a basic structure of a time-frequency region that is a radio resource region in which data or a control channel is transmitted in the 5G system.

Referring to FIG. 1, the horizontal axis in FIG. 1 represents a time domain and the vertical axis represents a frequency domain. The basic unit of resources in the time and frequency domain may be a resource element (RE) 1-01 and may be defined by one orthogonal frequency division multiplexing (OFDM) symbol 1-02 on the time axis and one subcarrier 1-03 on the frequency axis. In the frequency domain, $N_{sc}^{RB}$ (e.g., 12) consecutive REs may constitute one resource block (RB) 1-04.

Figure 2:
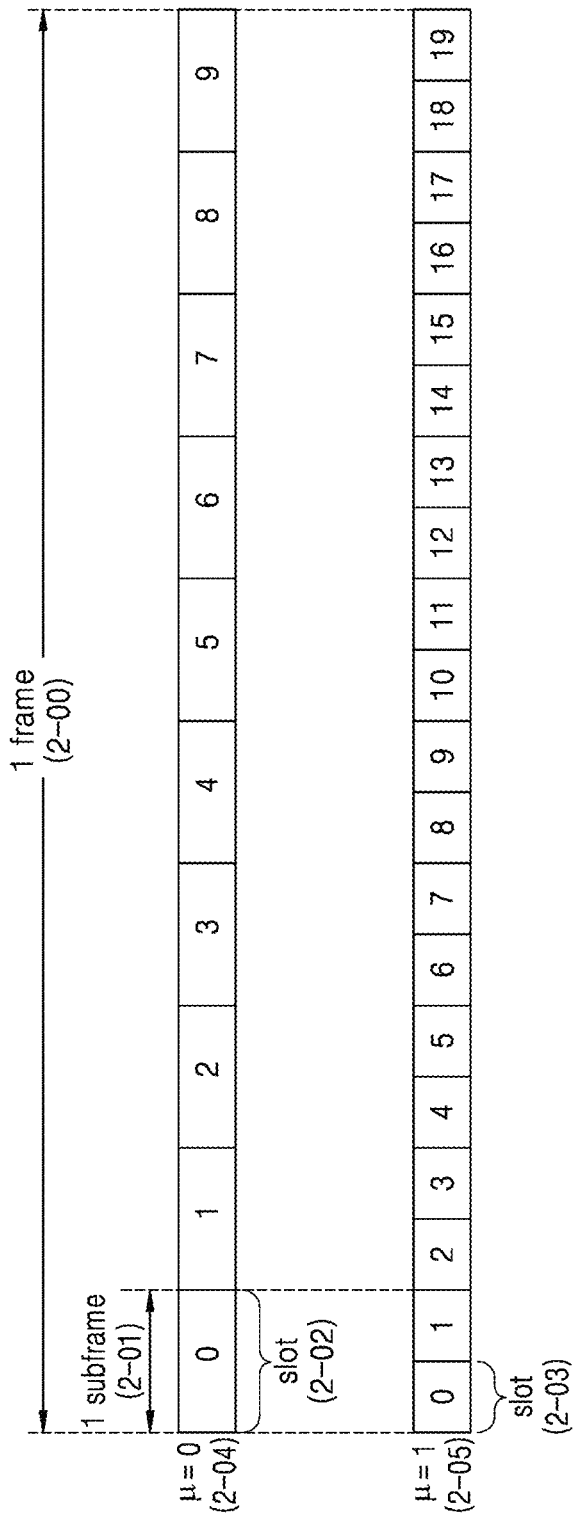
FIG. 2 illustrates a frame, subframe, and slot structure in $5^{th}$ generation (5G) communication technology.

FIG. 2 illustrates a frame, subframe, and slot structure in the 5G.

Referring to FIG. 2, FIG. 2 illustrates an example of a structure of frame 2-00, subframe 2-01, and slot 2-02. One frame 2-00 may be defined as 10 ms. One subframe 2-01 may be defined as 1 ms, and thus, one frame 2-00 may include a total of 10 subframes 2-01. One slot 2-02 or 2-03 may be defined as 14 OFDM symbols (i.e., the number of symbols per slot ($N_{symb}^{slot}$)=14). One subframe 2-01 may include one or more slots 2-02 or 2-03, and the number of slots 2-02 or 2-03 per subframe 2-01 may vary according to configuration values (2-04 and 2-05) for subcarrier spacing. In the example of FIG. 2, a case where subcarrier spacing values are set to µ=0 (2-04) and µ=1 (2-05) is illustrated. In the case of µ=0 (2-04), one subframe 2-01 may include one slot 2-02, and in the case of µ=1 (2-05), one subframe 2-01 may include two slots 2-03. That is, the number of slots per subframe ($N_{slot}^{subframe,\mu}$) may vary according to the configuration values µ for the subcarrier spacing, and accordingly, the number of slots per frame ($N_{slot}^{frame,\mu}$) may vary. $N_{slot}^{subframe,\mu}$ and $N_{slot}^{frame,\mu}$ according to the subcarrier spacing values µ may be defined as in table 1 below.

TABLE 1

| Subcarrier spacing values | | | |
| --- | --- | --- | --- |
| µ | $N_{symb}^{slot}$ | $N_{slot}^{frame,\mu}$ | $N_{slot}^{subframe,\mu}$ |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the NR, one component carrier CC or serving cell may include up to 250 or more RBs. Thus, when a terminal always receives the entire serving cell bandwidth as in LTE, the power consumption of the terminal may be extreme, and in order to solve this limitation, a base station may configure one or more bandwidth parts (BWPs) to the terminal to support the terminal to change a reception region in the cell. In the NR, the base station may configure "initial BWP," which is a bandwidth of CORESET #0 (or common search space (CSS)), to the terminal through MIB. Thereafter, the base station may configure an initial BWP (first BWP) of the terminal through radio resource control (RRC) signaling and notify at least one piece of BWP configuration information that may be indicated through downlink control information (DCI) in the future. Thereafter, the base station may notify a BWP ID through the DCI to indicate which band maybe used by the terminal. When the terminal fails to receive the DCI in the currently allocated BWP for a certain time or more, the terminal may return to "default BWP" and attempt to receive the DCI.

Figure 3:
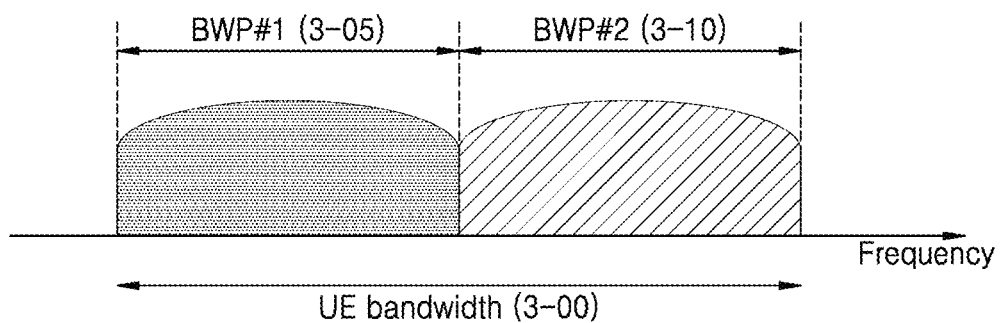
FIG. 3 illustrates an example of a bandwidth part (BWP) configuration according to some embodiments in a wireless communication system according to an embodiment of the disclosure.

FIG. 3 illustrates an example of a BWP configuration in a wireless communication system according to an embodiment of the disclosure.

Referring to FIG. 3, FIG. 3 illustrates an example in which a terminal (UE) bandwidth 3-00 is configured as two bandwidth parts, that is, a bandwidth part #1 3-05 and a bandwidth part #2 3-10. The base station may configure one or more bandwidth parts to the terminal and may configure information as in Table 2 below for each bandwidth part.

TABLE 2

| Configuration information |
| --- |
| BWP ::=            SEQUENCE { |
|   bwp-Id              BWP-Id, |
|   locationAndBandwidth      INTEGER (1..65536), |
|   subcarrierSpacing       ENUMERATED |
|                {n0, n1, n2, n3, n4, n5}, |
|   cyclicPrefix         ENUMERATED {  extended  } |
| } |

In addition to the configuration information described in Table 2, various parameters related to the bandwidth part may be configured to the terminal. The above information may be transmitted from the base station to the terminal through higher layer signaling, for example, RRC signaling.

At least one bandwidth part among the configured one or more bandwidth parts may be activated. Information about the activation/deactivation of the configured bandwidth part may be semi-statically transmitted from the base station to the terminal through RRC signaling or may be dynamically transmitted through a medium access control (MAC) control element (CE) or DCI.

The configuration for the bandwidth part supported by the 5G communication system may be used for various purposes.

For example, when the bandwidth supported by the terminal is smaller than the system bandwidth, only the bandwidth supported by the terminal may be configured through the setting for the bandwidth part. For example, the frequency position of the bandwidth part may be configured to the terminal in Table 2, and thus, the terminal may transmit/receive data at a particular frequency position in the system bandwidth.

As another example, for the purpose of supporting different numerologies, the base station may configure a plurality of bandwidth parts to the terminal. For example, in order to support data transmission/reception using a subcarrier spacing of 15 kHz and a subcarrier spacing of 30 kHz to a random terminal, two bandwidth parts may be configured to use subcarrier spacings of 15 kHz and 30 kHz, respectively. Different bandwidth parts may be frequency-division-multiplexed (FDMed), and when data is to be transmitted/received at particular subcarrier spacings, the bandwidth part configured at the particular subcarrier spacings may be activated.

As another example, for the purpose of reducing power consumption of the terminal, the base station may configure bandwidth parts having bandwidths of different sizes to the terminal. For example, when the terminal supports a very large bandwidth, for example, a bandwidth of 100 MHz, and always transmits/receives data with the bandwidth, it may cause very large power consumption. Particularly, it may be very inefficient in terms of power consumption for the terminal to monitor an unnecessary downlink control channel for a large bandwidth of 100 MHz while there is no traffic. Therefore, in order to reduce power consumption of the terminal, the base station may configure a bandwidth part of a relatively small bandwidth, for example, a bandwidth part of 20 MHz, to the terminal. The terminal may perform a monitoring operation in a 20 MHz bandwidth part in a situation where there is no traffic and may transmit/receive data by using a 100 MHz bandwidth part according to the indication of the base station when data is generated.

Figure 4:
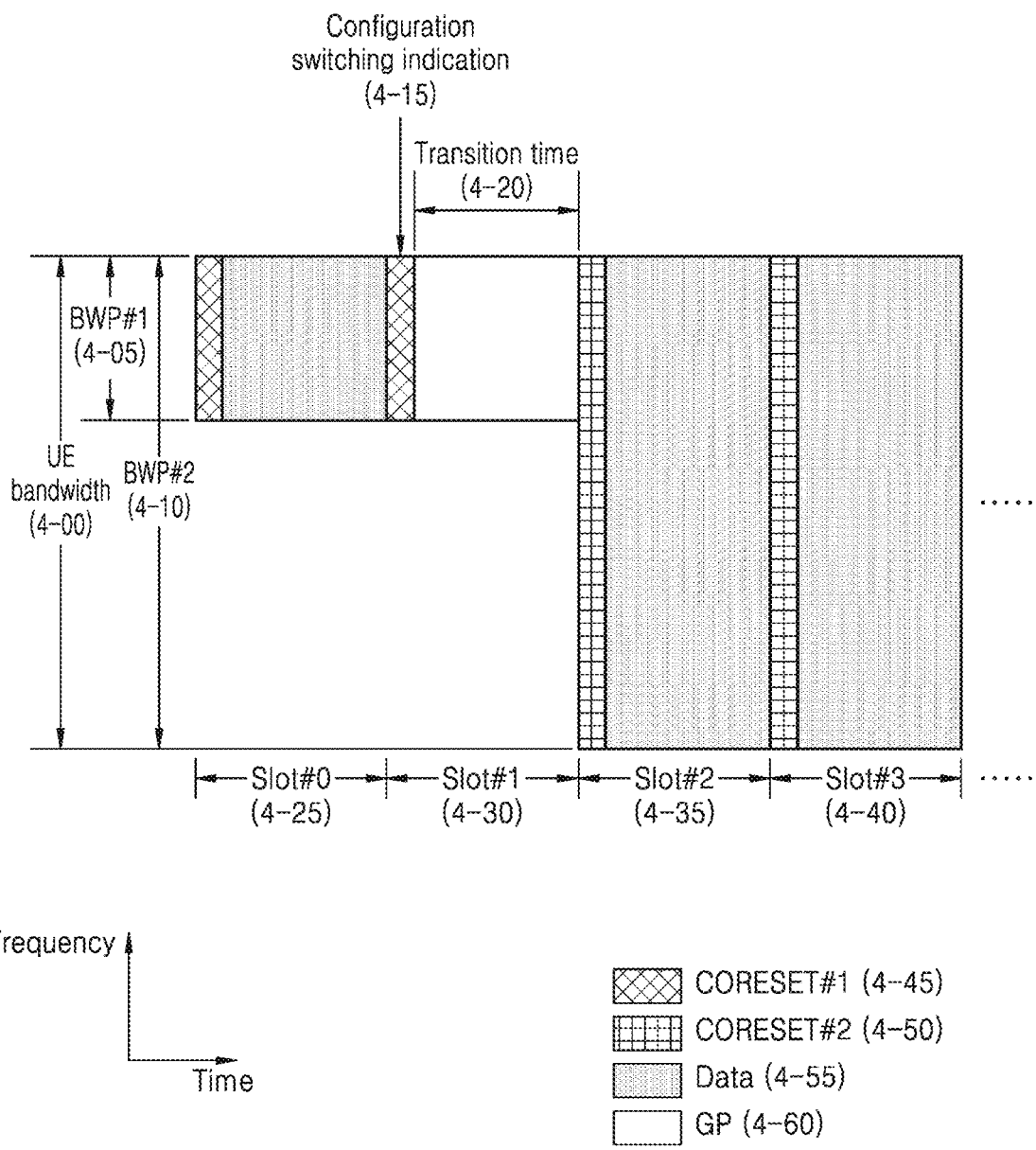
FIG. 4 illustrates an example of a BWP indication and change in a wireless communication system according to an embodiment of the disclosure.

FIG. 4 illustrates an example of a BWP indication and change in a wireless communication system according to an embodiment of the disclosure.

Referring to FIG. 4, as described in Table 2, the base station may configure one or more bandwidth parts to the terminal and may notify the terminal of information about the bandwidth of a bandwidth part, the frequency position of a bandwidth part, the numerology of a bandwidth part, or the like by the configuration for each bandwidth part. FIG. 4 illustrates an example in which two bandwidth parts, that is, a bandwidth part #1 (BWP #1) 4-05 and a bandwidth part #2 (BWP #2) 4-10, are configured in a terminal bandwidth 4-00 to one terminal. One or more bandwidth parts in the configured bandwidth may be activated, and an example in which one bandwidth part is activated may be considered in FIG. 4. In FIG. 4, the bandwidth part #1 4-05 among the bandwidth parts configured in a slot #0 4-25 is activated, and the terminal may monitor a physical downlink control channel (PDCCH) in a control region #1 4-45 set in the bandwidth part #1 4-05 and may transmit/receive data 4-55 in the bandwidth part #1 4-05. The control region in which the terminal receives the PDCCH may vary according to which bandwidth part among the configured bandwidth parts is activated, and accordingly, the bandwidth in which the terminal monitors the PDCCH may vary.

The base station may further transmit, to the terminal, an indicator for changing the configuration for the bandwidth part. Here, changing the configuration for the bandwidth part may be considered the same as an operation of activating a particular bandwidth part (e.g., changing the activation from a bandwidth part A to a bandwidth part B). The base station may transmit a configuration change indicator (configuration switching indicator) to the terminal in a particular slot, and the terminal may determine a bandwidth part to be activated by applying the changed configuration according to the configuration change indicator from a particular time point after receiving the configuration change indicator from the base station and may monitor the PDCCH in the control region configured in the activated bandwidth part.

In FIG. 4, the base station may transmit a configuration switching indicator 4-15 indicating the change of the activated bandwidth part from the existing bandwidth part #1 4-05 to the bandwidth part #2 4-10, to the terminal in a slot #1 4-30. After receiving the indicator, the terminal may activate the bandwidth part #2 4-10 according to the content of the indicator. In this case, a transition time 4-20 for changing the bandwidth part may be required, and accordingly, a time point for changing and applying the bandwidth part to be activated may be determined. FIG. 4 illustrates a case where a transition time 4-20 of one slot is required after receiving the configuration switching indicator 4-15. Data transmission/reception may not be performed in the transition time 4-20 (4-60). Accordingly, the bandwidth part #2 4-10 may be activated in a slot #2 4-35 to perform an operation of transmitting/receiving a control channel and data in the corresponding bandwidth part.

The base station may pre-configure one or more bandwidth parts to the terminal by higher layer signaling (e.g., RRC signaling), and the configuration switching indicator 4-15 may indicate activation by mapping with one of the bandwidth part configurations preset by the base station. For example, an indicator of log 2N bits may select and indicate one of N pre-configured bandwidth parts. In Table 3 below, an example of indicating configuration information about a bandwidth part by using a 2-bit indicator is described.

TABLE 3

| Indication of configuration information | |
|---|---|
| Indicator | Bandwidth part settings |
| 00 | Bandwidth setting A set by higher layer signaling |
| 01 | Bandwidth setting B set by higher layer signaling |

TABLE 3-continued

| Indication of configuration information | |
|---|---|
| Indicator | Bandwidth part settings |
| 10 | Bandwidth setting C set by higher layer signaling |
| 11 | Bandwidth setting D set by higher layer signaling |

The configuration switching indicator 4-15 for the bandwidth part described in FIG. 4 may be transmitted from the base station to the terminal in the form of medium access control (MAC) control element (CE) signaling or L1 signaling (e.g., common DCI, group-common DCI, or terminal-specific DCI).

According to the configuration switching indicator 4-15 for the bandwidth part described in FIG. 4, from which time point the bandwidth part activation maybe applied may depend on the following. From which time point the configuration switching maybe applied may depend on a predefined value (e.g., applied after N (=1) slot after receiving the configuration switching indicator), may be configured by the base station to the terminal through higher layer signaling (e.g., RRC signaling), or may be partially included and transmitted in the content of the configuration switching indicator 4-15. Alternatively, it may be determined by a combination of the above methods. After receiving the configuration switching indicator 4-15 for the bandwidth part, the terminal may apply the changed configuration from the time point obtained by the above method.

Hereinafter, a downlink control channel in the 5G communication system will be described in more detail with reference to the drawings.

Figure 5:
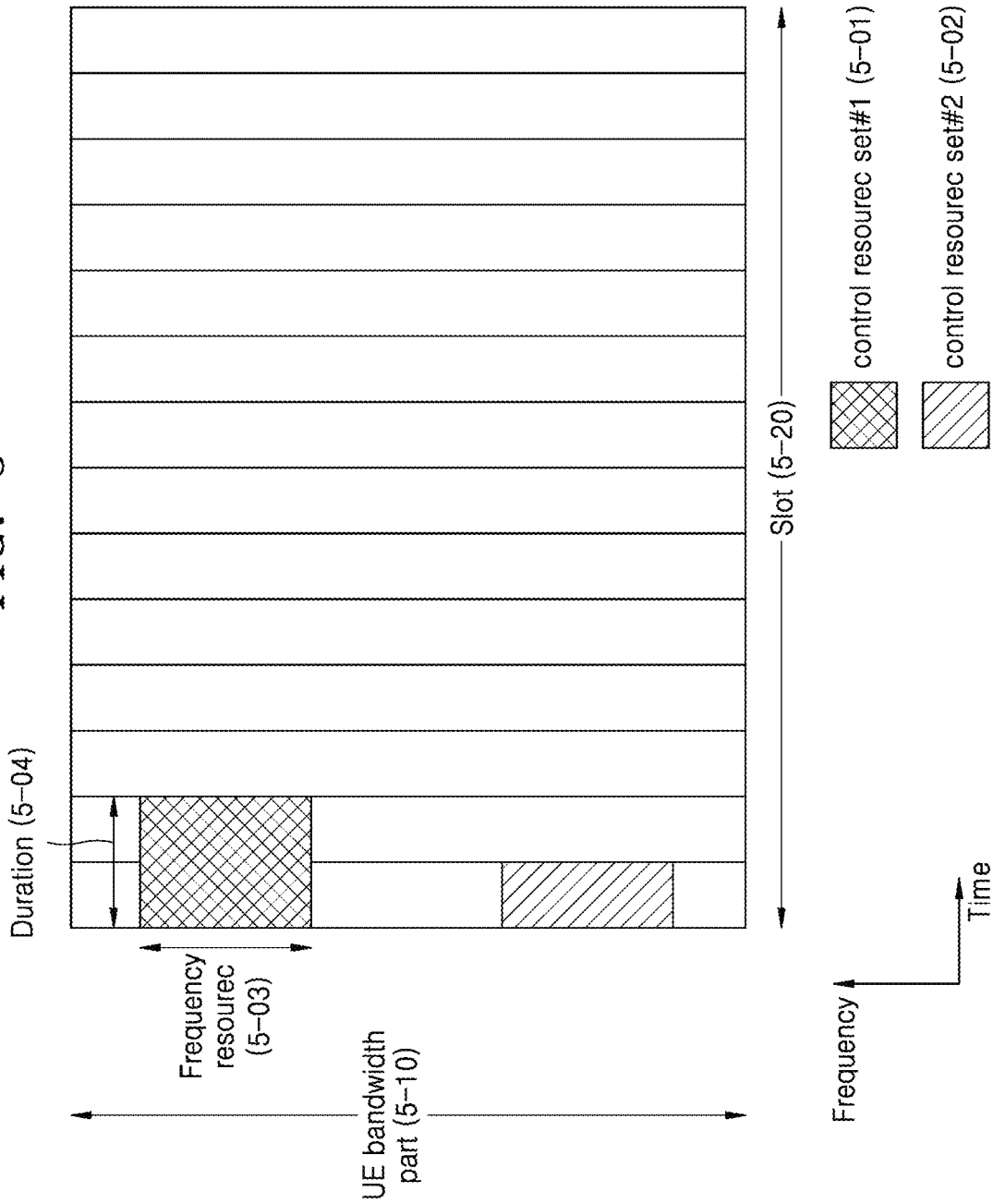
FIG. 5 illustrates an example of control region configuration of a downlink control channel in a wireless communication system according to an embodiment of the disclosure.

FIG. 5 illustrates an example of control region configuration of a downlink control channel in a wireless communication system according to an embodiment of the disclosure.

Referring to FIG. 5, FIG. 5 illustrates an example in which two control regions (control region #1 5-01 and control region #2 5-02) are configured in a bandwidth part 5-10 of the terminal on the frequency axis and one slot 5-20 on the time axis. The control regions 5-01 and 5-02 may be configured to particular frequency resources 5-03 in the entire terminal bandwidth part 5-10 on the frequency axis. The control regions 5-01 and 5-02 may be configured by one or more OFDM symbols on the time axis and may be defined by a control region length 5-04. In the example of FIG. 5, the control region #1 5-01 may be configured by a control region length of two symbols, and the control region #2 5-02 may be configured by a control region length of one symbol.

The control region in the 5G described above may be configured by the base station to the terminal through higher layer signaling (e.g., system information, master information block (MIB), or radio resource control (RRC) signaling). Configuring the control region in the terminal may mean providing the terminal with information such as a control region identifier, a frequency position of the control region, or a symbol length of the control region. For example, information of Table 4 may be included therein.

TABLE 4

| Configuration information |
|---|
| ControlResourceSet ::=  SEQUENCE { |
| -- Corresponds to L1 parameter 'CORESET-ID' |
| controlResourceSetId  ControlResourceSetId, |
|   (control region identifier) |
| frequencyDomainResources  BIT STRING (SIZE (45) ), |
|   (frequency domain resource allocation information) |
| duration  INTEGER  (1..maxCoReSetDuration), |
|   (time domain resource allocation information) |

TABLE 4-continued

| Configuration information | |
|---|---|
| cce-REG-MappingType (CCE-to-REG mapping method) | CHOICE { |
| interleaved | SEQUENCE { |
| reg-BundleSize (REG bundle size) | ENUMERATED {n2, n3, n6}, |
| precoderGranularity | ENUMERATED {sameAsREG-bundle, allContiguousRBs}, |
| interleaverSize (interleaver size) | ENUMERATED {n2, n3, n6} |
| shiftIndex | INTEGER (0..maxNrofPhysicalResourceBlocks-1) OPTIONAL |
| (interleaver shift) }, | |
| nonInterleaved }, | NULL |
| tci-StatesPDCCH StatesPDCCH) ) OF TCI-StateId (QCL configuration information) | SEQUENCE(SIZE (1..maxNrofTCI- OPTIONAL, |
| tci-PresentInDCI } | ENUMERATED {enabled} |

In Table 4, tci-StatesPDCCH (simply referred to as TCI state) configuration information may include information of a channel state information reference signal (CSI-RS) index or one or more synchronization signal(SS)/physical broadcast channel (PBCH) block indexes having a quasi co-located (QCL) relationship with a demodulation reference signal (DMRS) transmitted in the corresponding control region.

Next, DCI in the NR will be described in detail. In the NR, scheduling information about uplink data (or physical uplink shared channel (PUSCH)) or downlink data (or physical downlink shared channel (PDSCH)) may be transmitted from the base station to the terminal through the DCI. For efficient control channel reception of the terminal, various types of DCI formats may be provided as in Table 5 below according to purposes.

TABLE 5

| Type of DCI format | |
|---|---|
| DCI format | Usage |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

The terminal may monitor a fallback DCI format and a non-fallback DCI format with respect to the PUSCH or PDSCH. The fallback DCI format may include a fixed field predefined between the base station and the terminal, and the non-fallback DCI format may include a configurable field.

The DCI may be transmitted through a physical downlink control channel (PDCCH) through a channel coding and modulation process. A cyclic redundancy check (CRC) may be attached to a DCI message payload, and the CRC may be scrambled with a radio network temporary identifier (RNTI) corresponding to the identity of the terminal. Different RNTIs may be used according to the purpose of a DCI message, for example, terminal-specific (UE-specific) data transmission, a power control command, or a random access response. That is, the RNTI may not be explicitly transmitted but may be included and transmitted in a CRC calculation process. Upon receiving the DCI message transmitted on the PDCCH, the terminal may check the CRC by using the allocated RNTI, and, when the CRC check result is correct, the terminal may know that the message is transmitted to the terminal.

For example, the DCI for scheduling the PDSCH about system information (SI) may be scrambled with an SI-RNTI. The DCI for scheduling the PDSCH about a random access response (RAR) message may be scrambled with an RA-RNTI. The DCI for scheduling the PDSCH about a paging message may be scrambled with a P-RNTI. The DCI for notifying a slot format indicator (SFI) may be scrambled with an SFI-RNTI. The DCI for notifying a transmit power control (TPC) may be scrambled with a TPC-RNTI. The DCI for scheduling a terminal-specific PDSCH or PUSCH may be scrambled with a C-RNTI (cell RNTI).

A DCI format 0_0 may be used as fallback DCI for scheduling the PUSCH, and in this case, the CRC may be scrambled with a C-RNTI. The DCI format 0_0 in which the CRC is scrambled with the C-RNTI may include, for example, information of Table 6 below.

TABLE 6

| Information configuration |
|---|
| Identifier for DCI formats-[1] bit |
| Frequency domain resource assignment- [[$\log_3(N_{RB}^{UL,BWP}(N_{RB}^{UL,BWP} + 1)/2)$]] bits |
| Time domain resource assignment-X bits |
| Frequency hopping flag-1 bit. |
| Modulation and coding scheme-5 bits |
| New data indicator-1 bit |
| Redundancy version-2 bits |
| HARQ process number-4 bits |
| TPC command for scheduled PUSCH-[2] bits |
| UL/SUL Indicator-0 or 1 bit |

A DCI format 0_1 may be used as non-fallback DCI for scheduling the PUSCH, and in this case, the CRC may be scrambled with a C-RNTI. The DCI format 0_1 in which the CRC is scrambled with the C-RNTI may include, for example, information of Table 7 below.

TABLE 7

| Information configuration |
|---|
| - Carrier indicator-0 or 3 bits |
| - UL/SULindicator-0 or 1 bit |
| - Identier for DCIformats-[1] bits |
| - Bandwidth part indicator-0, 1 or 2 bits |
| - Frequency domain resource assignment |
|     • For resource allocation type 0, $\lceil N_{RB}^{DL,BWP}/P \rceil$ bits |
|     • For resource allocation type 1, $\lceil \log_2(N_{RB}^{DL,BWP}(N_{RB}^{DL,BWP}+1)/2) \rceil$ bits |
| - Time domain resource assignment-1,2,3, or 4 bits |
| - VRB-to-PRB mapping-0 or 1 bit, only for resource allocation type 1. |
|     • 0 bit if only resource allocation type 0 is configured; |
|     • 1 bit otherwise. |
| - Frequency hoppingflag-0 or 1 bit, only for resource allocation type 1. |
|     • 0 bit if only resource allocation type 0 is configured; |
|     • 1 bit otherwise. |
| - Modulation and coding scheme-5 bits |
| - New data indicator-1 bit |
| - Redundancy version-2 bits |
| - HARQ process number-4 bits |
| - 1st downlink assignment index-1 or 2 bits |
|     • 1 bit for semi-static HARQ-ACK codebook; |
|     • 2 bits for dynamic HARQ-ACK codebook with single-HARQ-ACK codebook. |
| - 2nd downlink assignment index-0 or 2 bits |
|     • 2 bits for dynamic HARQ-ACK codebook with two HARQ-ACK sub-codebooks; |
|     • 0 bit otherwise. |
| - TPC commandfor scheduledPUSCH-2 bits |
| - $SRS$ resouce indicator $- \left\lceil \log_2 \left( \sum_{k=1}^{L_{max}} \binom{N_{SRS}}{k} \right) \right\rceil$ or $\lceil \log_2(N_{SRS}) \rceil$ bits |
|     • $\left\lceil \log_2 \left( \sum_{k=1}^{L_{max}} \binom{N_{SRS}}{k} \right) \right\rceil$ bits for non-codebook based $PUSCH$ transmission; |
|     • $\lceil \log_2(N_{SRS}) \rceil$ bits for codebook based PUSCH transmission. |
| - Precoding information and number of layers-up to 6 bits |
| - Antenna ports-up to 5 bits |
| - SRS request-2 bits |
| - CSI request-0, 1, 2, 3, 4, 5, or 6 bits |
| - CBG transmission information-0,2, 4, 6, or 8 bits |
| - PTRS-DMRS association-0 or 2 bits. |
| - beta_offsetindicator-0 or 2 bits |
| - DMR sequence initialization-0 or 1 bit |

A DCI format 1_0 may be used as fallback DCI for scheduling the PDSCH, and in this case, the CRC may be scrambled with a C-RNTI. The DCI format 1_0 in which the CRC is scrambled with the C-RNTI may include, for example, information of Table 8 below.

TABLE 8

| Information configuration |
|---|
| Identifier for DCI formats-[1] bit |
| Frequency domain resource assignment- |
| $[\lceil \log_3(N_{RB}^{DL,BWP}(N_{RB}^{DL,BWP} + 1)/2) \rceil]$ bits |
| Time domain resource assignment-X bits |
| VRB-to-PRB mapping-1 bit. |
| Modulation and Coding scheme-5 bits |
| New data indicator-1 bit |
| Redundancy version-2 bits |
| HARQ process number-4 bits |
| Downlink assignment index-2 bits |
| TPC command for schedules PUCCH-[2] bits |
| PUCCH resource indicator-3 bits |
| PDSCH-to-HARQ feedback timing indicator-[3] bits |

A DCI format 1_1 may be used as non-fallback DCI for scheduling the PDSCH, and in this case, the CRC may be scrambled with a C-RNTI. The DCI format 1_1 in which the CRC is scrambled with the C-RNTI may include, for example, information of Table 9 below.

TABLE 9

| Information configuration |
|---|
| Carrier indicatar-0 or 3 bits |
| Identifier for DCI formats-[1] bits |
| Bandwidth partindicator-0, 1 or 2 bits |
| Frequency domain resource assignment |
| For resource allocation type 0, $\lceil N_{RB}^{DL,BWP}/P \rceil$ bitsd |
| For resource allocation type 1, $[\lceil \log_3(N_{RB}^{DL,BWP}(N_{RB}^{DL,BWP} + 1)/2) \rceil]$ bits |
| Time domain resource assignment-1, 2, 3, or 4 bits: |
| VRB-to-PRB mapping-0 or 1 bit. only for resource allocation type 1. |
| 0 bit if only resource allocation type 0 is configured; |
| 1 bit otherwise. |
| PRB bundling size indicator-0 or 1 bits |
| Rate matching indicator-0, 1, or 2 bits |
| ZP CSI-RS trigger-0, 1, or 2 bits |
| For transport block 1: |
| Modulation and coding scheme-5 bits: |
| New data indicator-1 bit |
| Redundancy version-2 bits |

TABLE 9-continued

Information configuration

For transport block 2:
Modulation and coding scheme-5 bits
New data indicator-1 bit
Redundancy version-2 bits
HARQ process number-4 bits
Downlink assignmentindex-0 or 2 or 4 bits
TPC command for scheduled PUCCH-2 bits
PUCCH resource indicator-3 bits
PDSCH-to-HARQ_feedback timing indicator-3 bits
Antenna ports-4, 5 or 6 bits
Transmission configuration indication-0 or 3 bits
SRS request-2 bits
CBG transmission information-0, 2, 4, 6, or 8 bits
CBG flushing out information-0 or 1 bit
DMRS sequence initialization-1 bit In the NR, in addition to the frequency-axis resource candidate allocation through the BWP indication, the following detailed frequency-domain resource allocation methods (FD-RAs) may be provided through the DCI.

Figure 6:
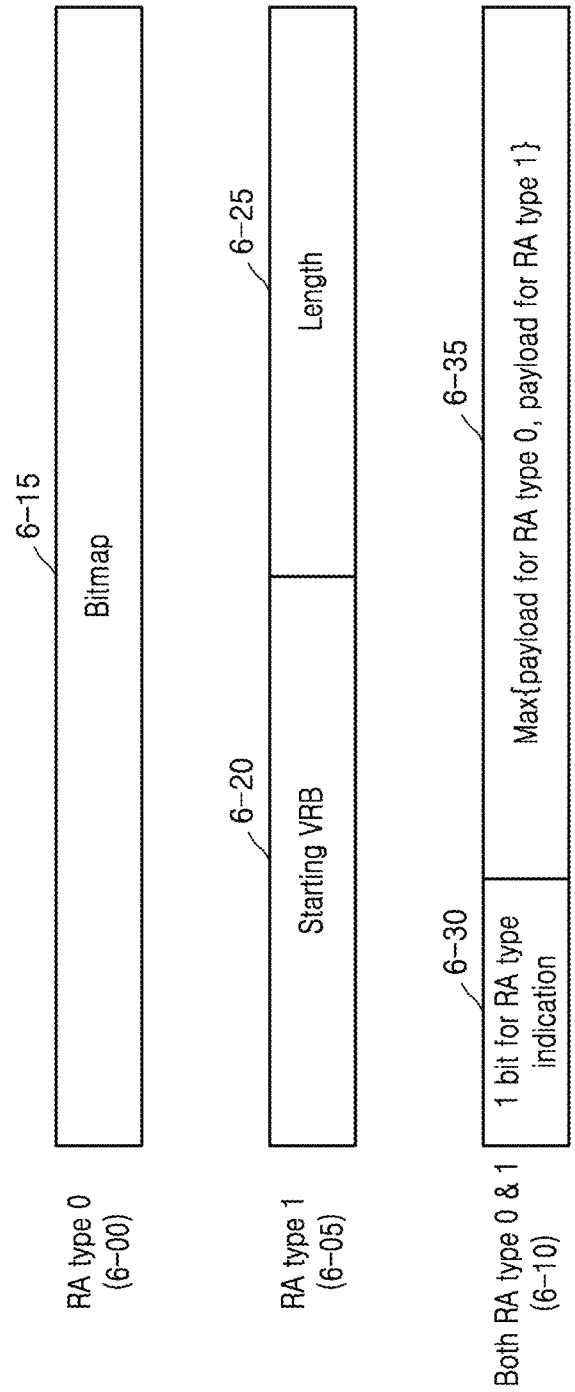
FIG. 6 illustrates example of physical downlink shared channel (PDSCH) frequency-axis resource allocation in a wireless communication system according to an embodiment of the disclosure.

FIG. 6 illustrates an example of PDSCH frequency-axis resource allocation in a wireless communication system according to an embodiment of the disclosure.

Referring to FIG. 6, when a terminal is configured to use only a resource type 0 through higher layer signaling (6-00), some DCI for allocating a PDSCH to the terminal may have a bitmap including NRBG bits. The conditions for this will be described again below. In this case, NRBG refers to the number of resource block groups (RBGs) determined as in Table 10 according to an higher layer parameter rbg-Size and a BWP size allocated by a BWP indicator, and data may be transmitted in the RBG represented as "1" by the bitmap.

TABLE 10

A number of RBGs

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

When a terminal is configured to use only a resource type 1 through higher layer signaling (6-05), some DCI for allocating a PDSCH to the terminal may have frequency-axis resource allocation information including $$\lceil \log_2(N_{RB}^{DL,BWP}(N_{RB}^{DL,BWP}+1)/2) \rceil$$

bits. The base station may configure a starting VRB 6-20 and a length 6-25 of a frequency-axis resource consecutively allocated therefrom.

When a terminal is configured to use both the resource type 0 and the resource type 1 through higher layer signaling (6-10), some DCI for allocating a PDSCH to the terminal may have frequency-axis resource allocation information including bits of a large value 6-35 among a payload 6-15 for setting the resource type 0 and payloads 6-20 and 6-25 for configuring the resource type 1. The conditions for this will be described again below. In this case, one bit may be added to the foremost part (MSB) of the frequency-axis resource allocation information in the DCI, and when the bit is "0," the resource type 0 may be indicated to be used, and when the bit is "1," the resource type 1 may be indicated to be used.

Figure 7:
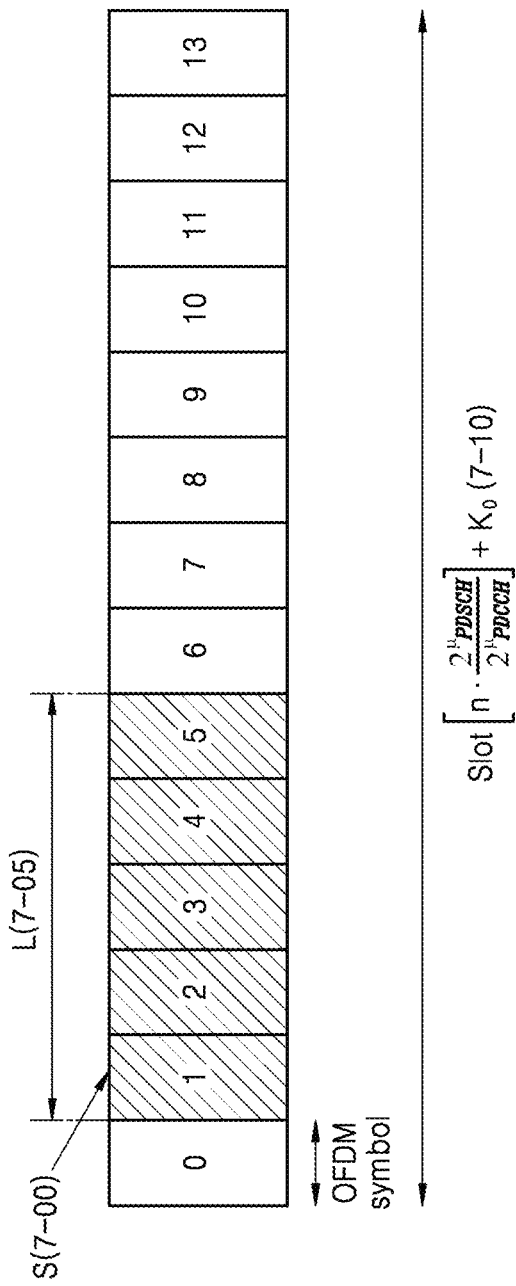
FIG. 7 illustrates an example of PDSCH time-axis resource allocation in a wireless communication system according to an embodiment of the disclosure.

FIG. 7 illustrates an example of PDSCH time-axis resource allocation in a wireless communication system according to an embodiment of the disclosure.

Referring to FIG. 7, the base station may indicate the time-axis position of a PDSCH resource according to subcarrier spacings $\mu_{PDSCH}$ and $\mu_{PDCCH}$ of a data channel and a control channel configured through an higher layer, a scheduling offset $K_0$ value, an OFDM symbol start position 7-00 and a length 7-05 in one slot dynamically indicated through the DCI.

Figure 8:
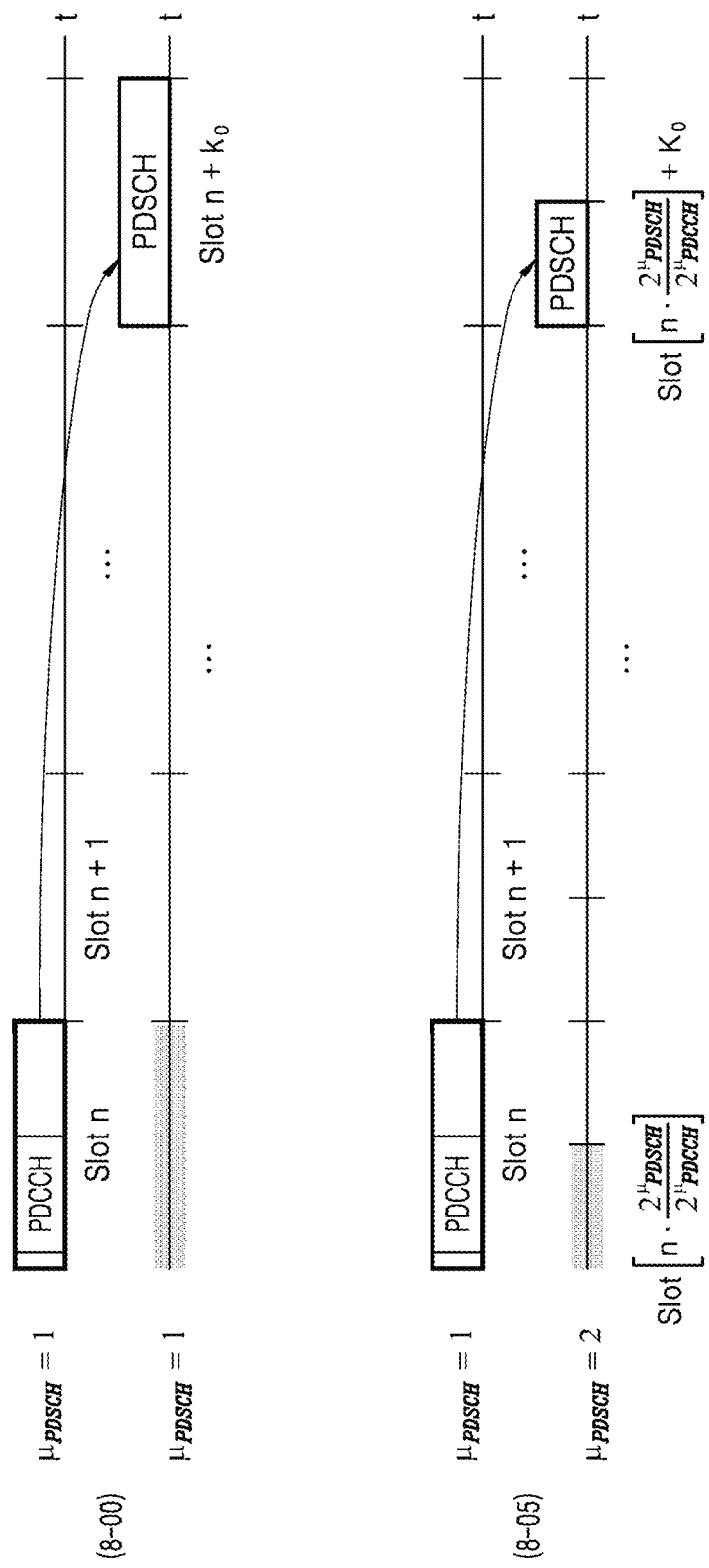
FIG. 8 illustrates an example of PDSCH time-axis resource allocation according to subcarrier spacing of a data channel and a control channel in a wireless communication system according to an embodiment of the disclosure.

FIG. 8 illustrates an example of PDSCH time-axis resource allocation according to subcarrier spacing of a data channel and a control channel in a wireless communication system according to an embodiment of the disclosure.

Referring to FIG. 8, when the subcarrier spacings of the data channel and the control channel are equal to each other (8-00, $\mu_{PDSCH}=\mu_{PDCCH}$), because the slot numbers for data and control are equal to each other, the base station and the terminal may know that a scheduling offset occurs according to a predetermined slot offset $K_0$. On the other hand, when the subcarrier spacings of the data channel and the control channel are different from each other (8-05, $\mu_{PDSCH} \neq \mu_{PDCCH}$), because the slot numbers for data and control are different from each other, the base station and the terminal may know that a scheduling offset occurs according to a predetermined slot offset $K_0$ based on the subcarrier spacing of the PDCCH.

Next, a portion of a decoding process for the PDSCH scheduled by the DCI in the NR will be described in detail.

The terminal may receive an indication of a modulation and coding scheme (MCS) of the PDSCH, together with the frequency and time resource information allocated for the PDSCH, through the DCI. An MCS field of the DCI may indicate an index for one table selected among the following three tables Table 11, Table 12, and Table 13 through the higher layer. The ranges of indexes indicated in initial transmission and HARQ retransmission may be different from each other, wherein indexes 0 to 28 of Table 11, indexes 0 to 27 of Table 12, and indexes 0 to 28 of Table 13 may be used in the initial transmission and indexes 29 to 31 of Table 11, indexes 28 to 31 of Table 12, and indexes 29 to 31 of Table 13 may be used in the retransmission. The index indicated in the initial transmission may contain the modulation order and target code rate information of the PDSCH transmitted, and the index indicated in the retransmission may contain the modulation order information of the PDSCH transmitted.

TABLE 11

MCS index
MCS index table 1 for PDSCH

| MCS Index $I_{MCS}$ | Modulation Order $Q_m$ | Target code Rate R x [1024] | Spectral efficiency |
| --- | --- | --- | --- |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |

TABLE 11-continued

MCS index
MCS index table 1 for PDSCH

| MCS Index $I_{MCS}$ | Modulation Order $Q_m$ | Target code Rate R x [1024] | Spectral efficiency |
|---|---|---|---|
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 12

MCS index
MCS index table 2 for PDSCH

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 2 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 13

MCS index
MCS index table 3 for PDSCH

| MCS Index $I_{MCS}$ | Modulation Order $Q_m$ | Target code Rate R x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

In the case of initial transmission, the terminal may need to know the size of a transport block (TB) before the scheduled PDSCH is encoded. For this purpose, the following process may be performed, and when two TBs are transmitted, the following process may be performed on each codeword.

In one embodiment of process 1, the terminal may calculate the total number of resource elements (REs) allocated for PDSCH transmission as $N_{RE}'=N_{sc}^{RB} \cdot N_{symb}^{sb} - N_{DMRS}^{PRB} - N_{ob}^{PRB}$ in a slot in which a PDSCH is scheduled and one physical resource block (PRB). In an equation for calculating the total number of REs allocated for PDSCH transmission, $N_{sc}^{RB}$ indicates "12" corresponding to the number of subcarriers in one PRB and $N_{symb}^{sb}$ indicates the number of symbols scheduled for the PDSCH in one slot. Also, $N_{DMRS}^{PRB}$ indicates the number of REs allocated for DM-RS in the PRB, which includes the overhead indicated in the DM-RS CDM groups without data on the DCI. Also, $N_{ob}^{PRB}$ indicates an overhead value indicated by the higher layer. Next, the total number of REs for the entire scheduled PRB is calculated as $N_R=\min(156, N_{RE}') \cdot n_{PRB}$, and in an equation for calculating the total number of REs for the entire scheduled PRB, $n_{PRB}$ indicates the total number of PRBs allocated for PDSCH transmission to the terminal.

In one embodiment of process 2, the intermediate number of information bits in the PDSCH may be calculated as $N_{info}=N_{RE} \cdot R \cdot Q_m \cdot \upsilon$, where R and $Q_m$ indicate a target rate and a modulation order indicated by the MCS, respectively, and "v" indicates the number of layers.

In one embodiment of process 3, when the calculated $N_{info}$ value is greater than 3824, the terminal may determine that a plurality of code blocks may be transmitted (process 5), and otherwise, the terminal may determine that a single code block is transmitted (process 4).

In one embodiment of process 4, when the terminal determines that a single code block is transmitted, the terminal may calculate $$N'_{info} = \max\left(24, 2^n \cdot \left\lfloor \frac{N_{info}}{2^n} \right\rfloor\right),$$

where $n = \max(3, \lfloor \log_2(N_{info}) \rfloor - 6)$, and then find a minimum transport block size (TBS) not smaller than $N_{info}'$ in Table 14. The TBS found by the terminal may be the size of a transport block (TB) determined by the terminal.

In one embodiment of process 5, when the terminal determines that a plurality of code blocks may be transmitted, the terminal may perform the following process according to $$N'_{info} = \max\left(3840, 2^n \times \mathrm{round}\left(\frac{N_{info} - 24}{2^n}\right)\right),$$

where $n = \lfloor \log_2(N_{info} - 24) \rfloor - 5$, where, a value, and a target code rate.

In one example of process 5-1, when the target code rate$\leq 1/4$, $$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil,$$

and the calculated TBS indicates the number of code blocks.

In one example of process 5-2, when the target code rate$> 1/4$, when $N_{info}' > 8424$, $$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil,$$

and the calculated TBS indicates the number of code blocks. Otherwise, $$TBS = 8 \cdot \left\lceil \frac{N'_{info} + 24}{8} \right\rceil - 24,$$

and a single code block is transmitted.

TABLE 14

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |

TABLE 14-continued

| Index and TBS | |
|---|---|
| Index | TBS |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

In the case of retransmission, it is assumed that the TB size of a PDSCH to be retransmitted is the same as the TB size calculated in the initial transmission.

Figure 9:
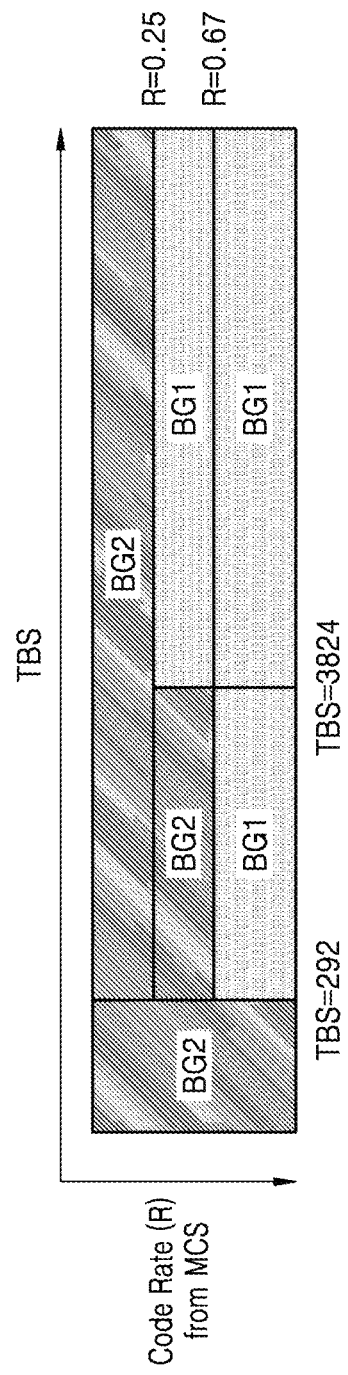
FIG. 9 illustrates a method of determining a low-density parity-check (LDPC) base graph used for encoding of a transport block (TB) and decoding of a codeword in a wireless communication system according to an embodiment of the disclosure.

FIG. 9 illustrates a method of determining a low-density parity-check (LDPC) base graph (BG) used for encoding of a transport block (TB) and decoding of a codeword in a wireless communication system according to an embodiment of the disclosure.

Referring to FIG. 9, a method of selecting an LDPC BG is illustrated. The terminal may find an LDPC BG for decoding the corresponding code word according to the target code rate indicated by the MCS and the calculated TB size. In the NR, one of BG1 and BG2 may be selected as in FIG. 9 according to the TB size and the code rate. In the case of BG1, the length of a code block may be determined as 8448, and in the case of BG2, the length of a code block 0 may be determined as 3840. In case of initial transmission, the terminal may simultaneously find the LDPC BG in calculating the TB size according to the situation. For example, when the above TB size calculation process 5-1) is applied, the terminal may find that the LDPC BG2 is used, and when the TB size calculation process 5-2) is applied, the terminal may find that the LDPC BG1 is used. In case of retransmission, the LDPC BG retransmitted may be assumed to be equal to the LDPC BG used in the initial transmission.

Next, the terminal may find data through processes such as de-interleaving, de-ratematching, and decoding of the received codeword according to the found TB size, the BG, and the like. In case of retransmission, the terminal may combine and then decode the received signal received in the initial transmission and the received signal received in the retransmission into a buffer corresponding to the LDPC BG and the TB size used in the initial transmission and the retransmission, thereby improving the reception reliability.

When the TB is transmitted in a plurality of code blocks, the terminal may retransmit only some of the code blocks in order to improve the retransmission efficiency, and in this case, the unit of code blocks retransmitted may be referred to as a code block group (CBG). When the terminal supports CBG transmission, the number of CBGs of the TB received by the terminal may be determined by the following equation.

$$M=\min(N,C).$$

In the above equation, N is a value configured to the higher layer and C is the number of code blocks transmitted. Among a total of M CBGs, the (m=0, 1, . . . , $M_1$-1, $M_1$=mod (C, M))th CBG may include the (m+$K_1$+k, k=0, 1, . . . , $K_1$-1, $K_1$=[C/M])th code blocks and the (m=$M_1$, $M_1$+1, . . . , M-1)th CBG may include the ($M_1K_1$+(m-$M_1$)$K_2$+k, k=0, 1, . . . , $K_2$-1, $K_2$=[C/M])th code blocks.

When receiving the CBG through the above configuration, the terminal may generate an ACK/NACK for each CBG and then generate a HARQ-ACK codebook and transmit the same to the base station. After receiving the HARQ-ACK information, the base station may perform retransmission in units of CBG and may notify the index of a retransmitted CBG to the terminal through the DCI. A DCI field in which the CBG index is transmitted may be a CBG transmission information field described above.

Figure 10:
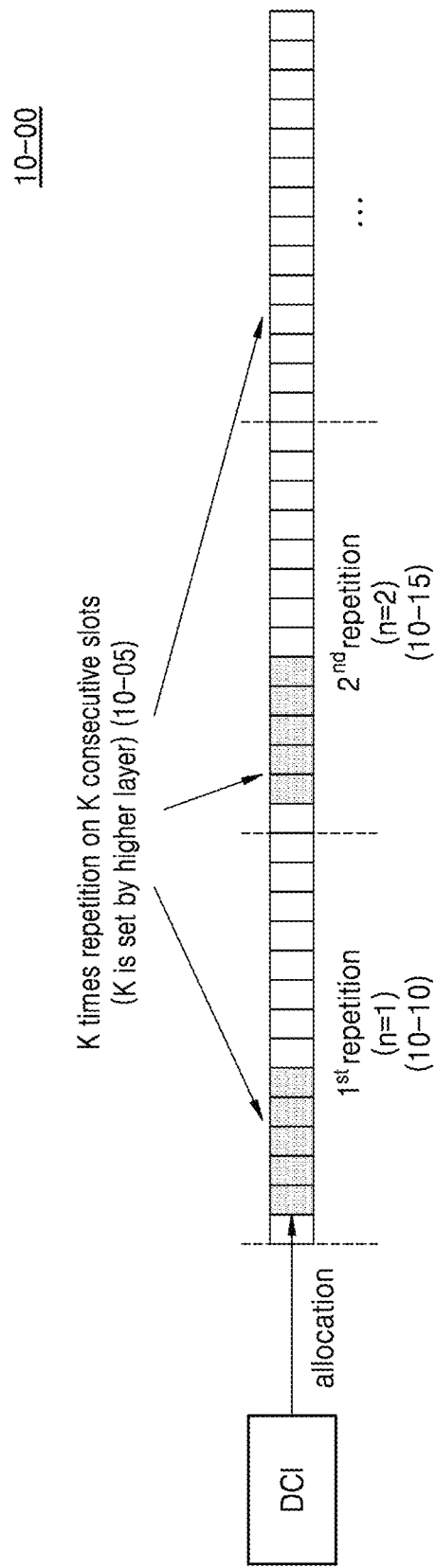
FIG. 10 illustrates an example of slot-by-slot repeated transmission (slot aggregation) in a wireless communication system according to an embodiment of the disclosure.

FIG. 10 illustrates an example of slot-by-slot repeated transmission (slot aggregation) in a wireless communication system according to an embodiment of the disclosure.

Referring to FIG. 10, in the NR, repeated transmission of the same PDSCH may be supported to improve the PDSCH reception reliability of the terminal (10-00). The base station may set the number of times of repeated transmissions of the PDSCH, for example, pdsch-AggregationFactor in PDSCH-Config to the higher layer such as RRC, and when the number of times of repeated transmissions is configured, the PDSCH scheduled in the DCI may be repeatedly transmitted in as many slots as the number of consecutive repeated transmissions (10-05). All the PDSCHs repeatedly transmitted may be allocated the same time resource in a slot, and as illustrated in FIG. 7, it may be an OFDM symbol start position 7-00 and a length 7-05 in one slot indicated by the DCI. Also, it may be assumed that the same transport block (TB) is transmitted in all the PDSCHs repeatedly transmitted. The terminal may expect that the repeatedly transmitted PDSCH is transmitted only in a single layer. Also, as in Table 15 below, a redundancy version (RV) of the repeatedly transmitted PDSCH may be determined according to an RV value indicated in the DCI for scheduling the PDSCH and an index of the repeatedly transmitted PDSCH.

TABLE 15

| RV of the repeatedly transmitted PDSCH | | | | |
|---|---|---|---|---|
| $rv_{id}$ indicated by the DCI scheduling the PDSCH | $rv_{id}$ to be applied to $n^{th}$ transmission occasion | | | |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In Table 15, "n" may indicate an index of each PDSCH within the number of times of repeated transmission determined as the higher layer (10-10, 10-15).

Referring to the above descriptions related to the above DCI structure, the PDSCH time/frequency resource allocation, and the PDSCH transmission and reception procedure performed based thereon, in LTE standard specification, the NR may use only a single transmission point/panel/beam in repeated transmission of the PDSCH. When cooperative communication using a plurality of transmission points/panels/beams may be applied in PDSCH repeated transmission, because more robust performance may be obtained against a channel blockage or the like, a repeated transmission scheme based on a plurality of transmission points/panels/beams is actively discussed in the NR standard specification.

In this case, in order to improve the reception reliability of the terminal, it may be necessary to combine transmission and reception points (TRPs)/beam-by-beam transmission signals. When different codewords are transmitted for each TRP/beam, all of the LDPC BGs used for encoding/decoding in addition to the TB size for each codeword may need to be equal for combining. As described above, the terminal may find the TB size for the codeword and the LDPC BG from the MCS and the scheduled RE amount indicated through the DCI, and when the TRP/beam-by-beam rate matching patterns are applied differently, the TB sizes and/or LDPC BGs for each codeword calculated by the terminal may be different and accordingly, combining may not be performed. Thus, the disclosure provides a method of improving the reception reliability by ensuring that the terminal performs decoding after matching the TB size and the LDPC BG of the TRP/beam-by-beam codeword.

Hereinafter, embodiments of the disclosure will be described in detail with the accompanying drawings. In the following description of the disclosure, detailed descriptions of well-known functions or configurations maybe omitted because they would unnecessarily obscure the subject matters of the disclosure. Also, terms to be described below may be terms defined considering functions in the disclosure and may vary according to users' or operators' intentions or practices. Therefore, the definition thereof should be made based on the contents throughout the specification.

Hereinafter, a base station may be an agent performing terminal resource allocation and may be at least one of a gNode B, a gNB, an eNode B, a Node B, a base station (BS), a radio access unit, a base station controller, or a node on a network. Examples of a terminal may include a user equipment (UE), a mobile station (MS), a cellular phone, a smartphone, a computer, or a multimedia system capable of performing a communication function. Also, although embodiments of the disclosure will be described below by using an NR or LTE/LTE-A system as an example, the embodiments of the disclosure may also be applied to other communication systems having similar technical backgrounds or channel forms. Also, the embodiments of the disclosure may also be applied to other communication systems through some modifications without departing from the scope of the disclosure by the judgment of those of ordinary skill in the art.

The description in the disclosure may be applied to FDD and TDD systems.

In the disclosure, higher layer signaling may be a method of transmitting signals from the base station to the terminal by using a downlink data channel of the physical layer or from the terminal to the base station by using an uplink data channel of the physical layer, and may also be referred to as RRC signaling, PDCP signaling, or MAC CE.

Hereinafter, in the disclosure, in order to determine whether to apply cooperative communication, the terminal may use various methods in which one or more PDCCHs for allocating the PDSCH to which cooperative communication is applied have a particular format, one or more PDCCHs for allocating the PDSCH to which cooperative communication is applied include a particular indicator indicating whether to apply cooperative communication, one or more PDCCHs for allocating the PDSCH to which cooperative communication is applied are scrambled with a particular RNTI, or cooperative communication application is assumed in a particular interval indicated by the higher layer. Hereinafter, for convenience of description, a case where the terminal receives a PDSCH to which cooperative communication is applied based on conditions similar to those described above maybe referred to as an NC-JT case.

Hereinafter, in the disclosure, determining the priority between A and B may be variously referred to as selecting a higher priority according to a predetermined priority rule and performing an operation corresponding thereto or omitting or dropping an operation with respect to having a lower priority.

Hereinafter, in the disclosure, the above examples will be described through a plurality of embodiments of the disclosure; however, they are not independent of each other and one or more embodiments of the disclosure may be applied simultaneously or in combination.

Embodiment 1: DCI Reception for NC-JT

Unlike the existing systems, 5G wireless communication systems may support not only services requiring high transmission rates but also services having very short transmission delays and services requiring high connection density. In a wireless communication network including a plurality of cells, TRPs, or beams, cooperative communication (coordinated transmission) between each cell, TRP, and/or beam may be an elementary technology for increasing the strength of a signal received by the terminal or efficiently performing each cell, TRP, and/or inter-beam interference control to satisfy various service requirements.

Joint transmission (JT) may be a representative transmission technology for the above cooperative communication and may increase the strength of a signal received by the terminal by supporting one terminal through different cells, TRPs, and/or beams based on the joint transmission technology. Meanwhile, because the characteristics of the channels between the cells, TRPs, and/or beams may be significantly different, it may be necessary to apply different precoding, MCS, or resource allocation to the links between the cells, TRPs, and/or beams. Particularly, in a case of non-coherent joint transmission (NC-JT) supporting non-coherent precoding between the cells, TRPs, and/or beams, individual downlink (DL) transmission information settings for the cells, TRPs, and/or beams may be important. Meanwhile, such individual DL transmission information configuration for the cells, TRPs, and/or beams may be a main factor to increase the payload required for DL DCI transmission, which may adversely affect the reception performance of the PDCCH for transmitting the DCI. Thus, it may be necessary to carefully design a tradeoff between the DCI information amount and the PDCCH reception performance for JT support.

Figure 11:
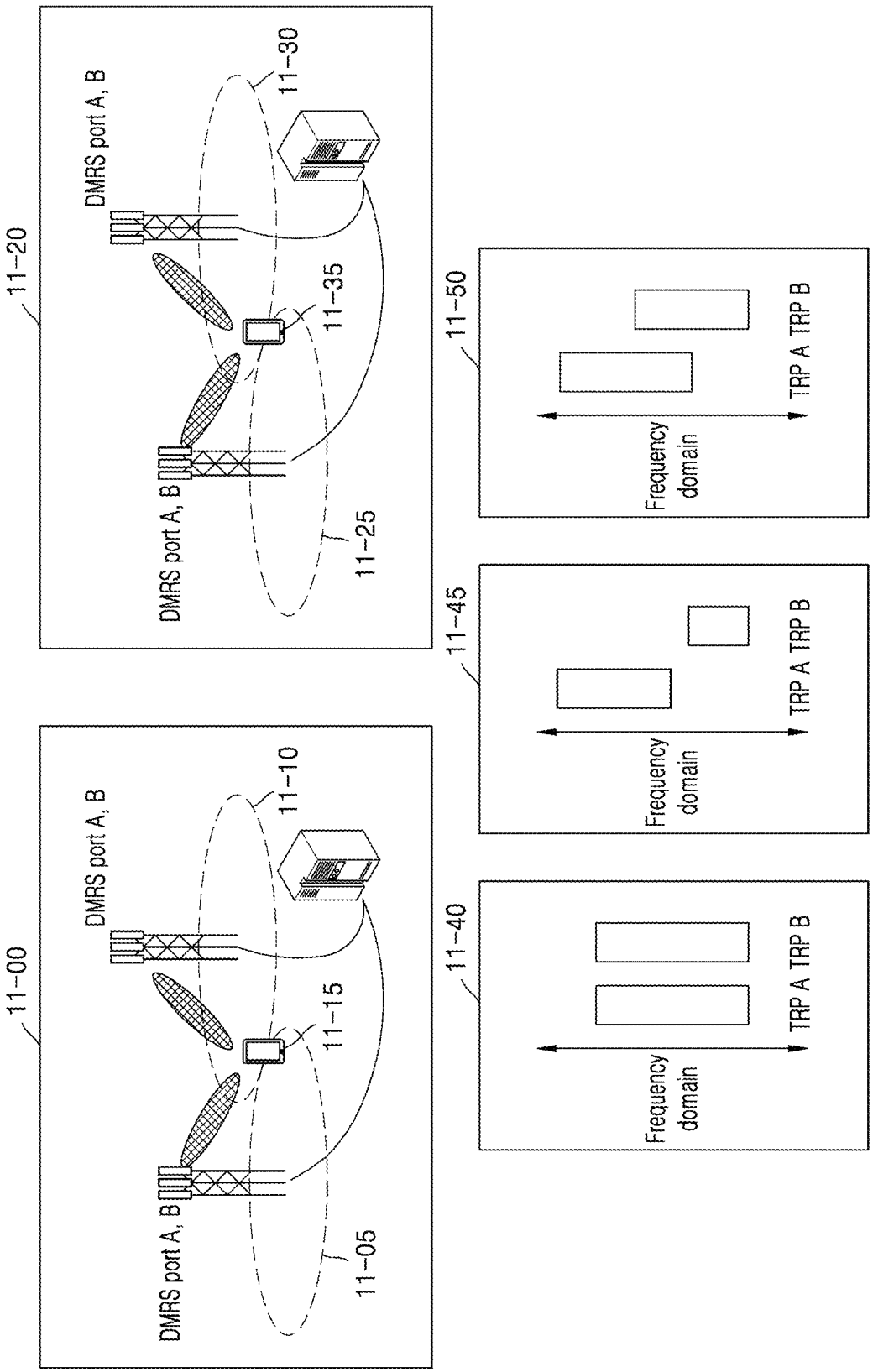
FIG. 11 illustrates an example of antenna port configuration and resource allocation for cooperative communication in a wireless communication system according to an embodiment of the disclosure.

FIG. 11 illustrates an example of antenna port configuration and resource allocation for cooperative communication in a wireless communication system according to an embodiment of the disclosure.

Referring to FIG. 11, examples of a joint transmission (JT) technique and radio resource allocation for each TRP according to the situation are illustrated. In FIG. 11, 11-00 is an example of coherent joint transmission (C-JT) supporting coherent precoding between the cells, TRPs, and/or beams. In the C-JT, single data (PDSCH) is transmitted from a TRP A 11-05 and a TRP B 11-10 to a terminal 11-15, and joint precoding is performed in a plurality of TRPs. This means that the TRP A 11-05 and the TRP B 11-10 transmit the same DMRS ports (e.g., DMRS ports A and B in both TRPs) for receiving the same PDSCH. In this case, the terminal may receive one piece of DCI information for receiving one PDSCH demodulated by the DMRS ports A and B.

In FIG. 11, 11-20 is an example of non-coherent joint transmission (NC-JT) supporting non-coherent precoding between the cells, TRPs, and/or beams. In the case of the NC-JT, a PDSCH may be transmitted to a terminal 11-35 for each cell, TRP, and/or beam, and individual precoding may be applied to each PDSCH. The cells, TRPs, and/or beams may transmit different PDSCHs to improve the throughput with respect to the single cell, TRP, and/or beam transmissions, or the cells, TRPs, and/or beams may repeatedly transmit the same PDSCH to improve the reliability the single cell, TRP, and/or beam transmission.

As in the case where the frequency and time resources used by multiple TRPs for PDSCH transmission are all the same (11-40), the case where the frequency and time resources used by multiple TRPs do not overlap at all (11-45), and the case where the frequency and time resources used by multiple TRPs overlap partially (11-50), various radio resource allocations may be considered. When multiple TRPs repeatedly transmit the same PDSCH in each case for the above radio resource allocation, when a receiving terminal does not know whether the PDSCH is repeatedly transmitted, the terminal may not perform combining in the physical layer for the PDSCH and thus there may be a limitation in improving the reliability. Therefore, the disclosure provides a repeated transmission indication and configuration method for improving the NC-JT transmission reliability.

Various forms, structures, and relations of DCIs may be considered to simultaneously allocate multiple PDSCHs to one terminal for NC-JT support.

Figure 12:
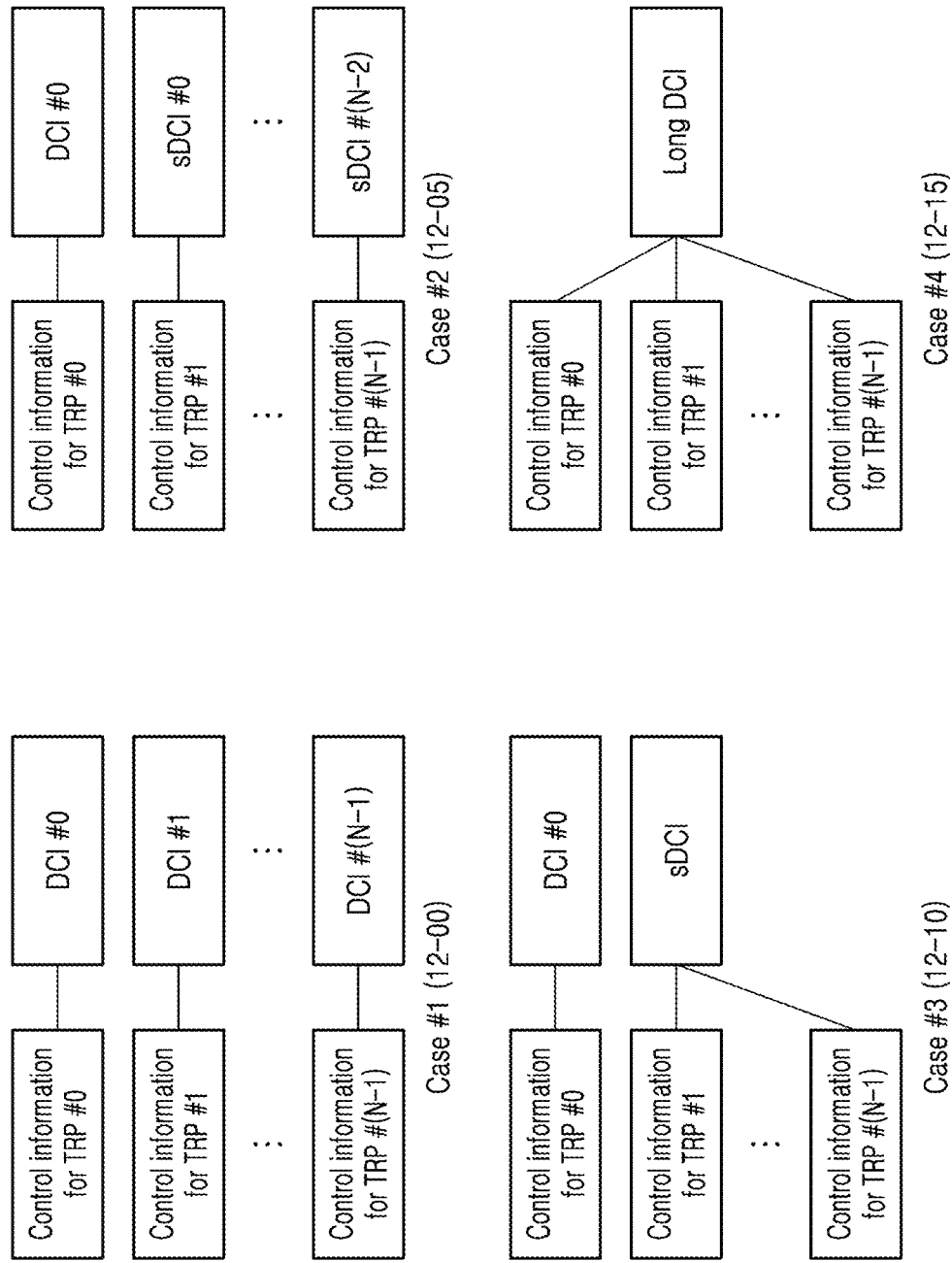
FIG. 12 illustrates an example of a downlink control information (DCI) configuration for cooperative communication in a wireless communication system according to an embodiment of the disclosure.
Figure 13A:
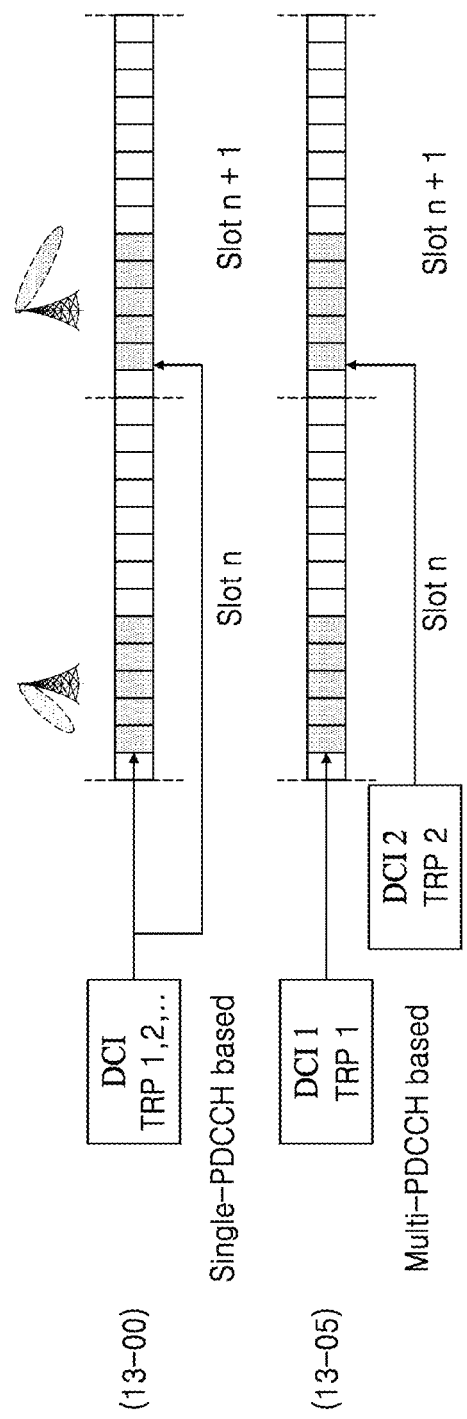
FIG. 13A illustrates an example of repeated transmission of multiple transmission and reception points (TRPs) based on various resource allocation methods in a wireless communication system according to an embodiment of the disclosure.
Figure 13B:
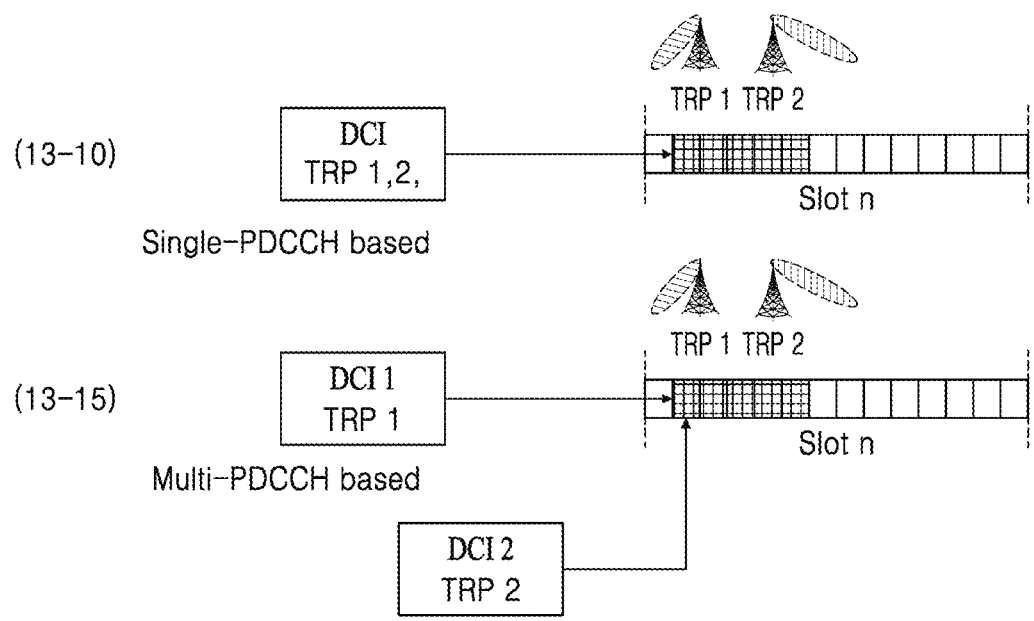
FIG. 13B illustrates an example of repeated transmission of multiple TRPs based on various resource allocation methods in a wireless communication system according to an embodiment of the disclosure.
Figure 13C:
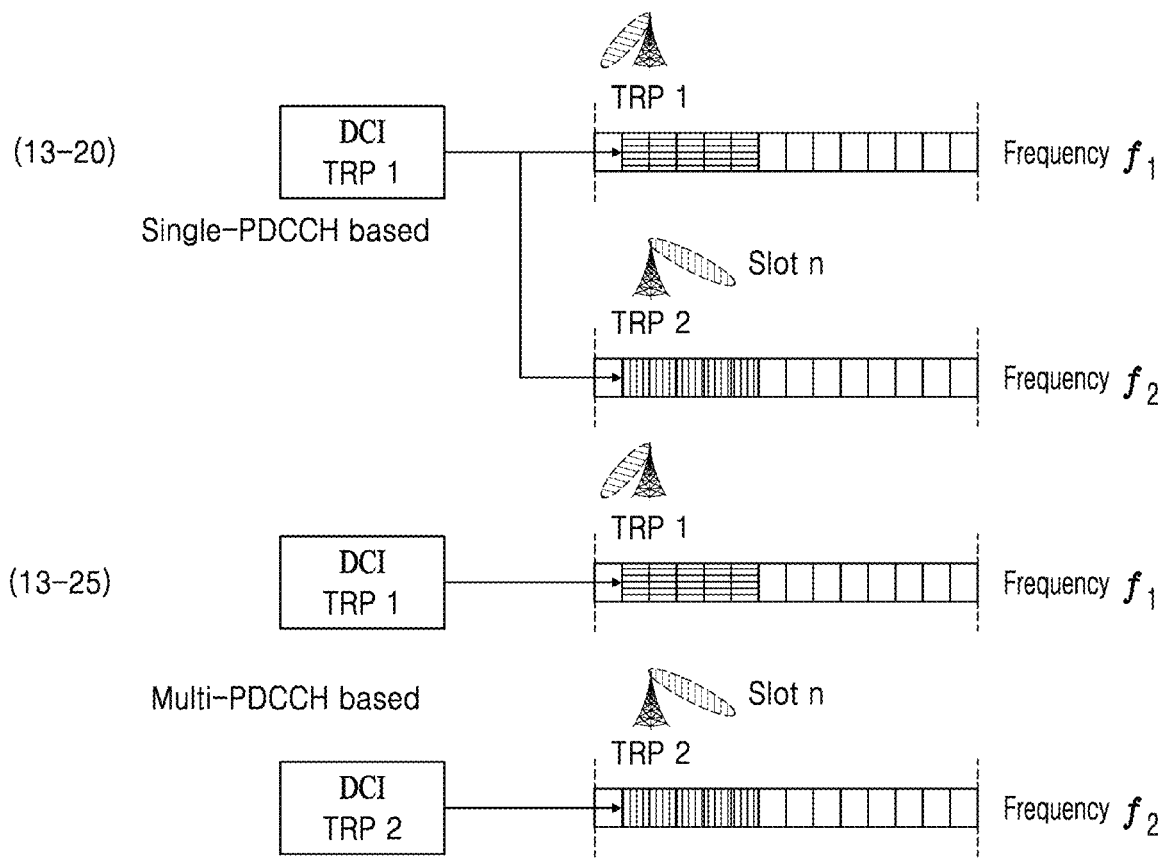
FIG. 13C illustrates an example of repeated transmission of multiple TRPs based on various resource allocation methods in a wireless communication system according to an embodiment of the disclosure.
Figure 13D:
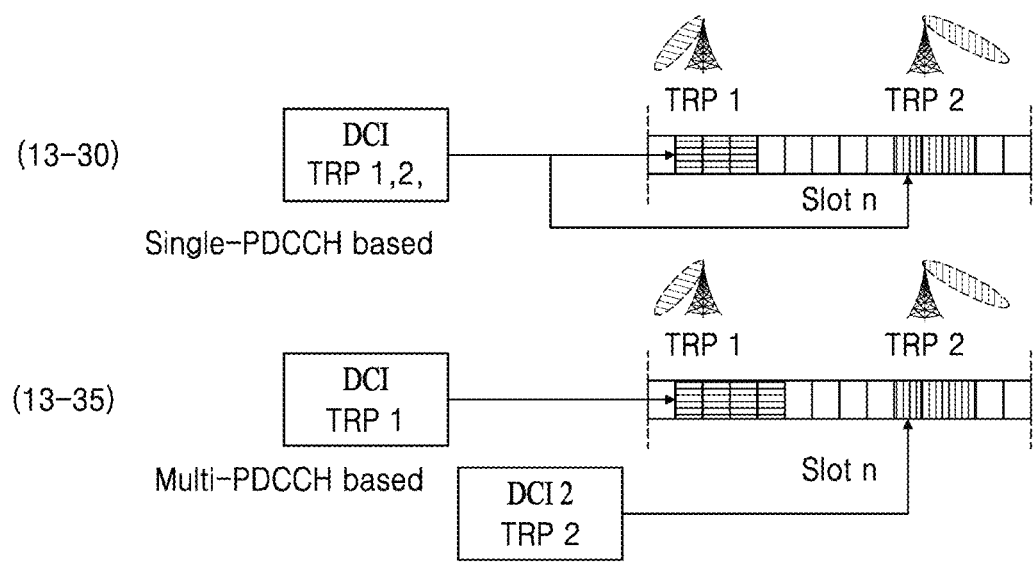
FIG. 13D illustrates an example of repeated transmission of multiple TRPs based on various resource allocation methods in a wireless communication system according to an embodiment of the disclosure.

FIG. 12 illustrates an example of a DCI configuration for cooperative communication in a wireless communication system according to an embodiment of the disclosure. Referring to FIG. 12, four examples of the DCI design for NC-JT support are illustrated.

In FIG. 12, a case #1 12-00 is an example in which control information about the PDSCH transmitted in (N−1) additional TRPs is transmitted in the same format (same DCI format) as control information about the PDSCH transmitted in a serving TRP, in a situation where (N−1) different PDSCHs are transmitted in (N−1) additional TRPs (TRP #1 to TRP #(N−1)) in addition to a serving TRP (TRP #0) used in single PDSCH transmission. That is, the terminals may acquire control information about the PDSCHs transmitted in different TRPs (TRP #0 to TRP #(N−1)) through the DCIs having the same DCI format and the same payload. In the case #1 described above, each PDSCH control (allocation) freedom degree may be completely ensured; however, when each DCI is transmitted in different TRPs, a DCI-by-DCI coverage difference may occur and thus the reception performance may degrade.

In FIG. 12, a case #2 12-05 is an example in which control information about the PDSCH transmitted in (N−1) additional TRPs is transmitted in a different format (different DCI format or different DCI payload) than control information about the PDSCH transmitted in a serving TRP, in a situation where (N−1) different PDSCHs are transmitted in (N−1) additional TRPs (TRP #1 to TRP #(N−1)) in addition to a serving TRP (TRP #0) used in single PDSCH transmission. For example, in the case of DCI #0 for transmitting control information about the PDSCH transmitted in a serving TRP (TRP #0), all of the information elements of a DCI format 1_0 or a DCI format 1_1 may be included, but in case of "shortened" DCIs (sDCI #0 to sDCI #(N−2)) for transmitting control information about the PDSCHs transmitted in cooperative TRPs (TRP #1 to TRP #(N−1)), only some of the information elements of the DCI format 1_0 or the DCI format 1_1 may be included. Thus, in the case of sDCI for transmitting control information about the PDSCHs transmitted in the cooperative TRP, the payload may be smaller than that of the normal DCI (nDCI) for transmitting PDSCH-related control information transmitted in the serving TRP or as many reserved bits as the number of bits insufficient in comparison with the nDCI may be included. In the case #2 described above, each PDSCH control (allocation) freedom degree may be restricted according to the contents of information elements included in the sDCI; however, because the reception performance of the sDCI may be higher that of the nDCI, the probability of occurrence of a DCI-by-DCI coverage difference may decrease.

In FIG. 12, a case #3 12-10 is another example in which control information about the PDSCH transmitted in (N−1) additional TRPs is transmitted in a different format (different DCI format or different DCI payload) than control information about the PDSCH transmitted in a serving TRP, in a situation where (N−1) different PDSCHs are transmitted in (N−1) additional TRPs (TRP #1 to TRP #(N−1)) in addition to a serving TRP (TRP #0) used in single PDSCH transmission. For example, in the case of DCI #0 for transmitting control information about the PDSCH transmitted in a serving TRP (TRP #0), all of the information elements of a DCI format 1_0 or a DCI format 1_1 may be included, and in case of control information about the PDSCHs transmitted in cooperative TRPs (TRP #1 to TRP #(N−1)), only some of the information elements of the DCI format 1_0 or the DCI format 1_1 may be collected and transmitted in one piece of "secondary" DCI (sDCI). For example, the sDCI may have at least one piece of information among HARQ-related information such as frequency-domain resource allocation (assignment) and time-domain resource allocation (assignment) of the cooperative TRPs. In addition, in case of information not included in the sDCI, such as a BWP indicator or a carrier indicator, it may follow the DCI (DCI #0, normal DCI, nDCI) of the serving TRP. In the case #3, each PDSCH control (allocation) freedom degree may be restricted according to the contents of information elements included in the sDCI, but the reception performance of the sDCI may be adjusted and the complexity of DCI blind decoding of the terminal may be reduced in comparison with the case #1 or the case #2.

In FIG. 12, a case #4 12-15 is an example in which control information about the PDSCH transmitted in (N−1) additional TRPs is transmitted in the same DCI (long DCI, lDCI) as control information about the PDSCH transmitted in a serving TRP, in a situation where (N−1) different PDSCHs are transmitted in (N−1) additional TRPs (TRP #1 to TRP #(N−1)) in addition to a serving TRP (TRP #0) used in single PDSCH transmission. That is, the terminal may acquire control information about the PDSCHs transmitted in different TRPs (TRP #0 to TRP #(N−1)) through single DCI. In the case #4, the complexity of DCI blind decoding of the terminal may not increase, but the PDSCH control (allocation) freedom degree may be low such that the number of cooperative TRPs may be restricted according to the long DCI payload restriction. In the following description and embodiments of the disclosure, the sDCI may refer to various auxiliary DCIs such as a shortened DCI, a secondary DCI, or a normal DCI (the DCI format 1_0 or 1_1 described above) including PDSCH control information transmitted in the cooperative TRP, and unless otherwise specified, the description may be similarly applicable to the various auxiliary DCIs.

In the following description and embodiments of the disclosure, the above case #1, case #2, and case #3 in which one or more DCIs (PDCCHs) are used for NC-JT support may be classified as multiple PDCCH-based NC-JT, the above case #4 in which single DCI (PDCCH) is used for NC-JT support may be classified as single PDCCH-based NC-JT.

In embodiments of the disclosure, "cooperative TRP" may be replaced with various terms such as "cooperative panel" or "cooperative beam" in actual application.

In embodiments of the disclosure, "the case where NC-JT is applied" may be interpreted variously according to situations, such as "the case where the terminal receives one or more PDSCHs simultaneously in one BWP," "the case where the terminal simultaneously receives the PDSCH based on two or more transmission configuration indicator (TCI) indications simultaneously in one BWP," and "the case where the PDSCH received by the terminal is associated with one or more DMRS port groups," but it is used as one expression for convenience of description.

In the disclosure, a radio protocol architecture for the NC-JT may be variously used according to TRP deployment scenarios. For example, when there is no or small backhaul delay between the cooperative TRPs, an architecture based on MAC layer multiplexing may be used (CA-like method). On the other hand, when the backhaul delay between cooperative TRPs is not negligible (e.g., when a time of 2 ms or more is required for CSI exchange or scheduling information exchange between the cooperative TRPs), the characteristics robust against delays may be secured by using an independent structure for each TRP from the RLC layer (DC-like method).

Embodiment 2: NC-JT Repeated Transmission Configuration Method

In the present embodiment of the disclosure, a detailed configuration and indication method for repeatedly transmitting the same PDSCH, in which two or more TRPs are equal to each other, described in Embodiment 1, in the same transmission band, for example, a transmission band, a component carrier, a BWP, or the like, are provided.

FIGS. 13A to 13D illustrate examples of repeated transmission of multiple TRPs based on various resource allocation methods in a wireless communication system according to an embodiment of the disclosure. FIGS. 13A to 13D illustrate examples in which two or more TRPs repeatedly transmit the same PDSCH.

In the current NR, as described above, as many slots as the number of times of repeated transmission may be required in the repeated transmission of the same PDSCH and the same cell, TRP, and/or beam may be used in each repeated transmission. On the other hand, through an embodiment of the disclosure described herein, the higher reliability may be achieved by using different TRPs for repeated transmissions in each slot (13-00, 13-05). Meanwhile, other repeated transmission methods may be used according to the terminal capability, the delay time requirement, the available resource state between TRPs, or the like. For example, when the terminal has the capability to receive NC-JT, each TRP may increase the frequency resource utilization rate and reduce the delay time required for PDSCH decoding by using a method of transmitting the same PDSCH in the same time and frequency resources (13-10, 13-15). The method may be efficient when the inter-TRP beams to be simultaneously transmitted are nearly orthogonal to each other and thus there is small inter-beam interference. As another example, each TRP may use a method of transmitting the same PDSCH at the same time and in the non-overlapping frequency resources (13-20, 13-25). The method may be efficient when the inter-beam interference of TRPs to be simultaneously transmitted is large and the available frequency resources of each TRP are large. As another example, each TRP may use a method of transmitting the same PDSCH on different OFDM symbols in the same slot (13-30, 13-35). The method may be efficient when there are not many available frequency resources of each TRP and the size of data to be transmitted is small. In addition to the above methods, modifications based on the above methods may be possible.

In the above methods, single DCI may be used to schedule repeated transmission (13-00, 13-10, 13-20, 13-30), and the DCI may indicate a list of all TRPs to participate in the repeated transmission. The list of TRPs to be repeatedly transmitted may be indicated in the form of a TCI state list, and the length of the TCI state list may change dynamically. The DCI may be repeatedly transmitted to improve the reliability, and different beams may be applied to each DCI in the repeated transmission. Alternatively, multiple DCI may be used to schedule repeated transmission (13-05, 13-15, 13-25, 13-35), and each DCI may correspond to the PDSCH of different TRPs to participate in the repeated transmission. The TRP for each DCI may be indicated in the form of a TCI state or a resource used in repeated transmission, and a detailed description thereof will be given in embodiments of the disclosure to be described below. Alternatively, shortened DCI may be used to schedule repeated transmission, and each of normal DCI and secondary DCI may correspond to the PDSCH of different TRPs to participate in the repeated transmission. The above indication method may be commonly applied to both the repeated transmission through multiple TRPs and the transmission of different data through multiple TRPs.

As for the above repeated transmission method, all TRPs may transmit a single codeword or transmit an independent codeword for each TRP. In the latter case, because different MCS and/or RV values may be determined for each codeword, more adaptive transmission may be possible than the former case. In the case of transmitting an independent codeword for each TRP, the terminal may perform the following process for each codeword for codeword decoding. Each of the following processes may be the same as the above process for single codeword decoding in the existing NR: 1) Calculation of TB size through the number of REs, MCS, or the like corresponding to the resource where the codeword is transmitted; and 2) Determination of LDPC BG from TB size and target code rate.

The parameters used in the above process may mean the following: (1) $N_{RE}$: The total number of REs allocated in PDSCH schedule. The total number of REs allocated in the PDSCH schedule may be calculated based on the number of REs rate-matched by the above frequency-axis RB resource allocation information, the time-axis symbol resource allocation information, rate matching pattern information indicated through the higher layer and/or the DCI, zero power channel state information reference signal (ZP-CSI-RS) configuration information, RS configuration information such as DMRS and nonzero power channel state information reference signal (NZP-CSI-RS), LTE-CRS-ToMatchAround configuration information, or the like; (2) R: Target code rate indicated by MCS; (3) $Q_m$: Modulation order indicated by MCS; and (4) v: The number of layers indicated by antenna port field of DCI or the like.

In this case, each of $N_{RE}$, R, $Q_m$, and v parameters for the repeatedly transmitted codeword or each of scheduling parameters for calculating $N_{RE}$, R, $Q_m$, and v parameters (e.g., the parameters indicated by the above frequency-axis resource allocation method and the parameters indicated by the time-axis resource allocation method) may be individually indicated for each codeword or one value may be indicated for all repeated transmission.

When one value is indicated for each parameter, the value indicated for each parameter may be applied as is to all repeated transmission codewords according to the repeated transmission technique and the base station configuration or the value modified according to a particular rule or equation may be applied for each repeated transmission codeword. For example, when a codeword for each TRP is repeatedly transmitted in different time resources (13-00, 13-05, 13-30, and 13-35), the same frequency-axis resource allocation as that indicated by the DCI may be applied to each codeword. Alternatively, when the codeword for each TRP is repeatedly transmitted in different frequency-axis resources (13-20, 13-25), non-overlapping frequency-axis resource allocation may be applied according to a particular rule for each codeword. For example, when two repeated transmission codewords are scheduled, the even-numbered precoding group (PRG) in the frequency-axis resource allocation indicated by the DCI may be allocated to the first codeword and the odd-numbered PRG may be allocated to the second codeword. In a case where the size of the PRG is configured to wideband, when the number of RBs allocated by frequency-axis resource allocation is N_RB, the first $\lceil N_{RB}/2 \rceil$ RBs may be allocated to the first codeword and the other $\lceil N_{RB}/2 \rceil$ RBs may be allocated to the second codeword. In summary, it may be as in Table 16.

TABLE 16

Allocation of a number of RBs

Comb-like frequency resource allocation between/among TRPs. For wideband PRG, first [N_RB/2] RBs are assigned to TCI state 1 and the remaining [N_RB/2] RBs are assigned to TCI state 2. For PRG size = 2 or 4, even PRGs within the allocated FDRA are assigned to TCI state 1 and odd PRGs within the allocated FDRA are assigned to TCI state 2.

As another example, when the codeword for each TRP is repeatedly transmitted in different frequency-axis resources (13-20, 13-25) or when the codeword for each TRP is repeatedly transmitted in different symbols (13-00, 13-05)), a symbol offset S (7-00) and a symbol length L (7-05) in the time-axis resource allocation indicated by the DCI may be equally applied to each codeword. Meanwhile, when the codeword for each TRP is repeatedly transmitted in different symbols in the slot (13-30, 13-35), a symbol offset S (7-00) and a symbol length L (7-05) in the time-axis resource allocation indicated by the DCI may be applied to the first codeword and L (7-05) may be equally applied as the symbol length to the second codeword but S'=S+L may be applied as the symbol offset. Also, L (7-05) may be equally applied as the symbol length to the nth codeword among the repeatedly transmitted TRP codewords, but S"=S+(n−1)L may be applied as the symbol offset.

When the rate matching pattern is different for each codeword, different amounts of RE resources are allocated, or different MCS values are configured, the TB sizes calculated for each codeword and the determined LDPC BGs may be different from each other. In this case, combining between codewords, for different TB sizes and LDPC BGs, may not be performed, and thus it may be difficult to achieve the target reception reliability in the terminal.

Thus, in order to achieve the target reception reliability of the terminal, it may be necessary to ensure the same TB size and the same LDPC BG between the codewords repeatedly transmitted for each TRP and the following method may be considered for this purpose.

In one example of method 1, the base station performs scheduling such that the TB sizes and LDPC BGs of all codewords may be equal to each other.

In one example of method 2, the terminal configures a representative value for TB size and LDPC BG calculation in repeated transmission.

A detailed description of each method described above will be described in the following embodiment.

Embodiment 3: Base Station Perform Scheduling Such that the TB Sizes and LDPC BGs of all Codewords are the Same The base station may previously know what TB size and LDPC BG values are to be calculated by the terminal with respect to the repeatedly transmitted codeword for each TRP. As described above, the TB to be calculated by the terminal may be obtained by the intermediate number of information bit $N_{info}=N_{RE} \cdot R \cdot Q_m \cdot v$ in the PDSCH, each element of the intermediate number of information bit may be the same as that described above.

The base station may configure constraint conditions on at least one of four elements of the above intermediate number of information bits per TRP/codeword in order for the terminal to obtain the same TB size for the codeword transmitted for each TRP. For example, the base station may configure, as the constraint condition, the case where the $N_{RE}$ value for each TRP/codeword is equal, the frequency and time-axis resource allocation information is equal, the rate matching pattern or the number of rate-matched REs is equal, the MCS is equal, or the number of layers is equal. Also, two or more of the above constraints may be combined. Alternatively, even when the above constraint condition is not applied, a combination of $N_{RE}$, R, $Q_m$, and v values may be configured such that the TB size calculated by the terminal for each TRP/codeword may be equal. Meanwhile, the terminal may not expect that the TB size calculated for each TRP/codeword maybe different, for combining.

As described above, the LDPC BG may be determined by the terminal through the TB size calculated by the terminal and the target code rate indicated by the MCS. The base station may configure constraint conditions on the TB size and/or MCS such that the LDPC BG found by the terminal for each TRP/codeword may be equal. For example, the constraint condition may be configured as described above such that that the TB size per TRP/codeword may be equal, and the constraint condition may be configured such that the MCS may be equal. Alternatively, even when the above constraint condition is not applied, a combination of TB size and MCS may be configured such that the TB size found by the terminal for each TRP/codeword may be equal. Meanwhile, the terminal may not expect that the LDPC BG calculated for each TRP/codeword maybe different, for combining.

According to the present embodiment of the disclosure, the change in the terminal for matching the TB size and LDPC BG per TRP/codeword may be small, but the constraint on the codeword schedule and transmission for each TRP in the base station may be large.

Embodiment 4: Configure Representative Value for Calculating TB Size and LDPC BG in Terminal in Repeated Transmission In Embodiment 3 described above, even when the channel state for each TRP or the amount of resources allocatable to the PDSCH is different, flexible resource allocation/MCS allocation may be difficult due to the above constraint conditions. On the other hand, in the present embodiment of the disclosure, the base station may schedule the repeated transmission PDSCH more flexibly considering the channel state for each TRP or the amount of available resources and the terminal may configure a representative value for calculating the TB size and LDPC BG with respect to the repeatedly transmitted codeword for each TRP, thereby making it possible to obtain the same TB size and LDPC BG for all codewords.

With respect to the repeatedly transmitted codeword for each TRP, a representative value for calculating the TB size and LDPC BG may be obtained from the TB size calculated for each codeword. For example, the TB size of the codeword for each TRP may be calculated according to the TB size calculation method in the NR described above and then the representative value of these TB sizes may be used for combining and decoding. When a total of N TB sizes of the codeword for each TRP are $TBS_1, TBS_2, \ldots, TBS_N$, the representative value of the TB size may be represented by a function such as $TBS=f(TBS_1, TBS_2, \ldots, TBS_N)$ and the following function may be considered as a function for calculating the TBS.

In one example of maximum value, $f(TBS_1, TBS_2, \ldots, TBS_N)=\max(TBS_1, TBS_2, \ldots, TBS_N)$. When the TB size of the codeword for each TRP is different, the TBS may be calculated based on the largest TB size. In this case, because the effective code rate is high, it may be efficient in terms of the throughput.

In one example of minimum value, $f(TBS_1, TBS_2, \ldots, TBS_N)=\min(TBS_1, TBS_2, \ldots, TBS_N)$. When the TB size of the codeword for each TRP is different, the TBS may be calculated based on the smallest TB size. In this case, because the effective code rate is low, high reliability may be obtained.

In one example of average value, $f(TBS_1, TBS_2, \ldots, TBS_N)=(TBS_1, TBS_2, \ldots, TBS_N)/N$. When the TB size of the codeword for each TRP is different, the TBS may be calculated based on the average value of the TB size.

In addition to the above functions, various functions may be considered as a function for TBS calculation. Alternatively, in order to reduce the calculation complexity of the terminal, instead of calculating all TB sizes for each codeword, the TB size for one codeword expected to have the largest or smallest TB size may be configured as a representative TB size and the terminal may calculate only the representative TB size. For example, when the MCS of the codeword for each TRP may be configured differently, the TB size corresponding to the codeword of the highest or lowest MCS may be set as a representative TB size. Alternatively, when the frequency/time-axis resource allocation of the codeword for each TRP may be configured differently, the TB size corresponding to the codeword to which the largest or smallest frequency resource/time resource/RE number is allocated may be configured as a representative TB size. A representative LDPC BG value may be obtained in the MCS corresponding to the representative TB size and the corresponding codeword.

Alternatively, the number of TBs may be determined based on the number of REs allocated to all codewords repeatedly transmitted. For example, when one frequency-axis resource allocation and time-axis resource allocation are indicated for the entire repeated transmission as described above, the $N_{RE}$ value according to the frequency-axis and time-axis resource allocation may be calculated and the representative TB size $TBS_{rep}$ may be obtained from the calculated $N_{RE}$ value. In this case, the same MCS and the number of layers may be indicated or applied to all the codewords repeatedly transmitted; that is, all of R, $Q_m$, and v of the repeatedly transmitted codeword may be equal. The TB size of each codeword repeatedly transmitted may be configured based on the representative TB size; for example, it may be set as at least as one of the following: TB size for each codeword is equal to the representative TB size, i.e., $TBS_1=TBS_2= \ldots =TBS_N=TBS_{rep}$; TB size for each codeword is equal to a value obtained by dividing the representative TB size by the number of repeatedly transmitted codewords, i.e., $TBS_1=TBS_2= \ldots =TBS\ N=\lceil TBS_{rep}/N\rceil$ or $TBS_1=TBS_2= \ldots =TBS_N=\lfloor TBS_{rep}/N\rfloor$.

Alternatively, a representative TRP for obtaining the representative value of the TB size may be configured. For example, in the case of repeated transmission at $TRP_1$, $TRP_2, \ldots, TRP_N$, the terminal may configure the TB size calculated from the codeword transmitted at TRP ($1 \le x \le N$), as the representative TB size. For convenience of description, the TRP maybe referred to as a representative TRP. Meanwhile, the terminal may fail to directly receive the instruction of information about the transmission TRP in the repeated transmission, and in this case, the terminal may implicitly configure the representative TRP through at least one of the following methods or a combination thereof.

In one example of method 1 of TCI state, two or more TCI states may be simultaneously activated for one PDSCH through DCI/MAC-CE or the like, wherein each of these TCI states may correspond to channel/beam information for each TRP used for repeated transmission. Thus, a particular TCI state may be used as the representative TRP. That is, the representative TB size may be calculated from the codeword corresponding to the particular TCI state. The particular TCI state may be, for example, the lowest/highest TCI state index or the first/last TCI state index among the activated TCI states.

In one example of method 2 of codeword index, when two codewords are scheduled in the DCI, each codeword may be interpreted as a codeword repeatedly transmitted when a particular condition is satisfied. The particular condition will be described in detail in Embodiment 5. In this case, a TRP corresponding to a particular codeword index, that is, the first or second codeword may be used as a representative TRP, and a representative TB size may be calculated from the corresponding codeword.

In one example of method 3 of DMRS port/port group/CDM group index, when two or more DMRS ports or CDM groups are used in repeated transmission, different DMRS ports/port groups/CDM groups may be used in different TRPs. In this case, a TRP corresponding to a particular DMRS port/port group/CDM group index, that is, the lowest/highest DMRS port/port group/CDM group index, may be used as a representative TRP and a representative TB size may be calculated from the corresponding codeword.

In one example of method 4 of frequency resource allocation information, in repeated transmission, frequency resources of each repeatedly transmitted codeword may be independently allocated. For example, a frequency-domain resource allocation (assignment) field on the NR DCI may be reinterpreted and n frequency-domain resource allocation (assignment) fields for n codewords may be used. Alternatively, n−1 frequency-domain resource allocation fields may be added. In this case, a TRP corresponding to a particular frequency-domain resource allocation field, that is, the lowest or highest-order field may be used as a representative TRP, and a representative TB size may be calculated from the corresponding codeword.

In one example of method 5 of frequency/time resource pattern, frequency/time resources used for each TRP in repeated transmission may follow a particular pattern. For example, the frequency/time resource allocated to the codeword transmitted in the first TRP may be dynamically indicated or quasi-statically determined through the DCI, and the frequency/time resource allocated to the codeword transmitted in the second TRP may be allocated according to a particular offset/pattern based on the resource of the first TRP. Alternatively, the frequency/time resources for all TRPs may be dynamically indicated or quasi-statically determined, and the resource for each TRP may be distributed according to a particular pattern within the determined resources. In this case, a TRP corresponding to a particular pattern order, for example, a TRP transmitting in the lowest RB or the first symbol/slot, may be used as a representative TRP and a representative TB size may be calculated from the corresponding codeword.

The frequency/time resource pattern may be configured as in Table 16 described above. In this case, a TRP corresponding to the even PRG or the odd PRG may be used as a representative TRP, and a representative TB size may be calculated from the codeword transmitted by the representative TRP.

Methods of implicitly configuring the representative TRP are not limited to the above examples. The above methods may be operated in combination of two or more as necessary, and there may be a priority between the methods. For example, when two or more TCI states are activated, a representative TRP is always determined according to the TCI state, and when only one TCI state is activated, a representative TRP may be determined according to the frequency/time resource pattern of repeated transmission.

Alternatively, the base station may explicitly indicate the representative TRP through the DCI/MAC-CE or the like, the terminal may calculate the representative TB size from the codeword transmitted in the indicated TRP. An indicator of the representative TRP may be one of the above-listed information, for example, an activated TCI state index, a codeword index, or a combination thereof.

Meanwhile, a representative LDPC BG may be obtained similarly to the method of calculating the representative TB size through the representative TRP.

Embodiment 5: DCI Indication Method for Repeated Transmission

In the case of repeated transmission through multiple TRPs, the repeated transmission and the representative TRP may be configured by the method 2) of Embodiment 4 described above, that is, by setting the second codeword of the DCI. In this case, the terminal may need to determine whether two codewords transmitted are codewords for different data as in the existing NR or codewords for repeated transmission. In order to determine this, the terminal may use the following method.

In one example of method 1, when repeated transmission is configured in the higher layer, it is determined as repeated transmission; otherwise, it is determined as different data transmission.

In one example of method 2, when multiple TCI states are activated, it is determined as repeated transmission, and when only a single TCI state is activated, it is determined as different data transmission.

In one example of method 3, when a particular MCS table, for example, an MCS table 3, is used, it is determined as repeated transmission; otherwise, it is determined as different data transmission.

In one example of method 4, when a particular RNTI, for example, an MCS-C-RNTI, an RNTI for NC-JT transmission, or an RNTI for repeated transmission is used, it is determines as repeated transmission; otherwise, it is determined as different data transmission.

A method of determining whether two codewords transmitted by the terminal are codewords for different data or codewords for repeated transmission is not limited to the above methods, and there may be various methods thereof. Also, when it is determined as repeated transmission, the terminal may not expect that two codewords transmitted maybe codewords for different data.

When it is determined as repeated transmission, because the terminal may not need to calculate the TB size in the codeword for the TRP other than the representative TRP, the target code rate may not need to be indicated in the MCS. Thus, in the codeword, the MCS index used to indicate only a modulation order in retransmission in the above MCS table may be indicated, or even when the MCS index used in initial transmission is indicated, the target code rate information of the index may be ignored and only the modulation order may be used. Alternatively, a new MCS index indicating only the modulation order may be used, and because up to four different modulation orders are indicated in the current NR, two bits may be required to indicate the corresponding MCS index.

In this case, currently, the payload for the second codeword may be redefined. Currently, 5 bits of an MCS field, 1 bit of a new data indicator (NDI) field, and 2 bits of a redundancy version (RV) field may be used for the second codeword. However, when only 2 bits are used for the MCS index as described above, an unused payload may occur and the unused payload may be used to indicate the third codeword information for repeated transmission. Also, when the case of retransmitting only a particular TRP among the TRPs participating in repeated transmission is not considered, the corresponding payload may be reused because the NDI field of the second codeword is not used.

FIG. 14 illustrates an example of redefinition of a DCI payload in repeated transmission of multiple TRPs in a wireless communication system according to an embodiment of the disclosure. Referring to FIG. 14, an example of a method of redefining the DCI payload for the second codeword is illustrated. In FIG. 14, 14-05 is an example of a method in which a field for the second codeword of the DCI is redefined to simultaneously indicate the modulation order and the redundancy version (RV) of the TRPs 2 and 3. Meanwhile, in repeated transmission, the RV of each codeword may be semi-statically configured through higher layer configuration. In FIG. 14, 14-10 is an example of a method in which, when the RV of each codeword is semi-statically set, a field for the second codeword of the DCI is redefined to simultaneously indicate the modulation order of the TRPs 2, 3, 4, and 5.

Embodiment 6: LDPC BG Configuration Method

Although the TB size transmitted for each TRP in the above repeated transmission may be equally calculated, the code rate value calculated according to the target code rate value indicated by the MCS or the amount of time/frequency resources allocated for each TRP for repeated transmission may vary. Thus, the LDPC BG calculated by the terminal may be different for each TRP. In this case, because the combining of received signals may be difficult as described above, a method of matching the LDPC BG for each TRP is presented in the present embodiment of the disclosure as follows.

In one example of method 1, when the LDPC BG for each TRP is different, the terminal may always select a particular LDPC BG (e.g., BG2). In this case, when there is no or small backhaul delay time between TRPs and thus information sharing between TRPs is possible, it may be effective in this case, each TRP may be scheduled through one piece of DCI. Among the two BGs used in the LDPC, the BG2 may be used for lower code rates and the BG1 may be used for relatively high code rates. Meanwhile, because the reception reliability may increase as the code rate decreases, it may be convenient in terms of the reliability to assume that the BG2 is selected when the LDPC BG for each TRP is different.

In one instance of method 1-1, when the LDPC BG for each TRP is different, the terminal may select a LDPC BG according to a certain condition. Among the two LDPC BGs, the maximum length of a single code block that may be generated for the BG2 is 3840, whereas that for the BG1 is 8448. Thus, the number of code blocks may vary depending on which LDPC BG is selected for a particular TBS, which may affect the reception performance. For example, for a particular range of code rates, it may be more convenient in terms of the reliability to transmit the same TB to one code block by using the BG1 than to transmit the same TB to two code blocks by using the BG2. Thus, the selected BG may be different according to a particular condition, for example, a TBS value calculated for each TRP and/or a code rate for each TRP. For example, when TBS<=3824, the BG2 may always be selected; otherwise, the BG1 may be selected.

In one example of method 2, when the LDPC BG for each TRP is different, the terminal may select a LDPC BG according to higher layer configuration. Selecting the LDPC BG according to the higher layer configuration may be effective when there is no backhaul between TRPs or a long delay time therebetween and thus information sharing between TRPs is not easy. In this case, each TRP may be scheduled through different DCI. When the LDPC BG is configured as the higher layer, the base station and the terminal may expect to encode/decode the BG selected according to the higher layer configuration regardless of the TBS and the code rate. According to the higher layer configuration, one BG, for example, the BG2, may always be forcibly configured as in the method described in Method 1 and the BG for each TBS range may be configured as in the method described in method 1-1.

When the LDPC BG is configured according to the above method, the maximum length of the code block and the number of code blocks may be configured according to the corresponding LDPC BG. When CBG-based transmission is configured in the terminal, as the number of code blocks used to calculate the CBG is modified, the number of CBGs used and the method of interpreting the CBGTI field of the DCI may also be modified. Also, when the terminal uses a CBG-based HARQ-ACK codebook, the terminal may generate an HARQ-ACK codebook to correspond to the number of CBGs according to the LDPC BG configured according to the above method.

Alternatively, in order not to change the operation of the existing hardware, a restriction may be configured to calculate the same number of code blocks in any LDPC BG and the number of code blocks may be 1. For this purpose, the TBS transmitted for each TRP and calculated by the terminal may be restricted to a particular value or less, and the corresponding value may be 3824 that is the minimum value of the TB length where code block segmentation is performed in the LDPC BG1 and BG2. By applying the above constraints, it may be possible to match the LDPC BG for each TRP without changing operations such as CBG-related retransmission and HARQ-ACK codebook generation.

Figure 15:
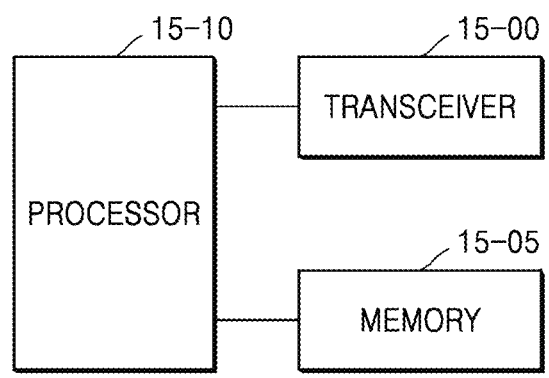
FIG. 15 illustrates a structure of a terminal in a wireless communication system according to an embodiment of the disclosure.

FIG. 15 illustrates a structure of a terminal in a wireless communication system according to an embodiment of the disclosure.

Referring to FIG. 15, the terminal may include a transceiver 15-00, a memory 15-05, and a processor 15-10. The transceiver 15-00 and the processor 15-10 of the terminal may operate according to the communication method of the terminal described above. However, the components of the terminal are not limited to the above example. For example, the terminal may include more components or fewer components than the above components. In addition, the transceiver 15-00, the memory 15-05, and the processor 15-10 may be implemented as a single chip.

The transceiver 15-00 may exchange signals with the base station. Here, the signals may include control information and data. For this purpose, the transceiver 15-00 may include, for example, an RF transmitter for up-converting and amplifying a transmitted signal and an RF receiver for low-noise-amplifying and down-converting a received signal. However, this is merely an embodiment of the transceiver 15-00, and the components of the transceiver 15-00 are not limited to the RF transmitter and the RF receiver.

Also, the transceiver 15-00 may receive a signal through a radio channel and output the signal to the processor 15-10 and may transmit a signal output from the processor 15-10, through a radio channel.

The memory 15-05 may store programs and data necessary for the operation of the terminal. Also, the memory 15-05 may store control information or data included in the signals transmitted/received by the terminal. The memory 15-05 may include a storage medium or a combination of storage media such as ROM, RAM, hard disk, CD-ROM, and DVD. Also, the memory 15-05 may be provided in plurality.

Also, the processor 15-10 may control a series of processes such that the terminal may operate according to the above embodiment of the disclosure. For example, the processor 15-10 may control the components of the terminal to receive the DCI including two layers to receive a plurality of PDSCHs simultaneously. The processor 15-10 may be provided in plurality and the processor 15-10 may control the components of the terminal by executing the programs stored in the memory 15-05.

Figure 16:
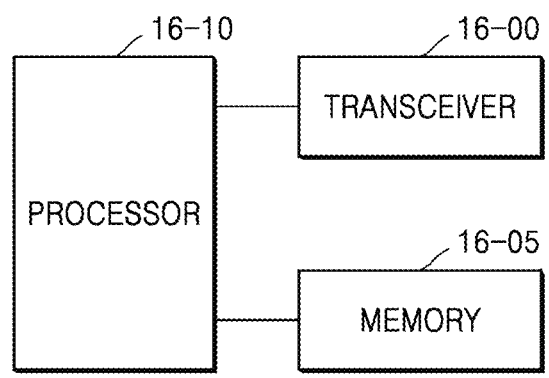
FIG. 16 illustrates a structure of a base station in a wireless communication system according to an embodiment of the disclosure.

FIG. 16 illustrates a structure of a base station in a wireless communication system according to an embodiment of the disclosure.

Referring to FIG. 16, the base station may include a transceiver 16-00, a memory 16-05, and a processor 16-10. The transceiver 16-00 and the processor 16-10 of the base station may operate according to the communication method of the base station described above. However, the components of the base station are not limited to the above example. For example, the base station may include more components or fewer components than the above components. In addition, the transceiver 16-00, the memory 16-05, and the processor 16-10 may be implemented as a single chip.

The transceiver 16-00 may exchange signals with the terminal. Here, the signals may include control information and data. For this purpose, the transceiver 16-00 may include, for example, an RF transmitter for up-converting and amplifying a transmitted signal and an RF receiver for low-noise-amplifying and down-converting a received signal. However, this is merely an embodiment of the transceiver 16-00, and the components of the transceiver 16-00 are not limited to the RF transmitter and the RF receiver.

Also, the transceiver 16-00 may receive a signal through a radio channel and output the signal to the processor 16-10 and may transmit a signal output from the processor 16-10, through a radio channel.

The memory 16-05 may store programs and data necessary for the operation of the base station. Also, the memory 16-05 may store control information or data included in the signals transmitted/received by the base station. The memory 16-05 may include a storage medium or a combination of storage media such as ROM, RAM, hard disk, CD-ROM, and DVD. Also, the memory 16-05 may be provided in plurality.

Also, the processor 16-10 may control a series of processes such that the base station may operate according to the above embodiment of the disclosure. For example, the processor 16-10 may control each component of the base station to configure and transmit two layers of DCIs including allocation information for a plurality of PDSCHs. The processor 16-10 may be provided in plurality and the processor 16-10 may control the components of the base station by executing the programs stored in the memory 16-05.

The methods according to the embodiments of the disclosure described in the specification or the claims may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Also, the programs may be stored in a memory configured by a combination of some or all of such storage devices. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured by a combination thereof. Such a storage device may be connected through an external port to an apparatus performing an embodiment of the disclosure. Also, a separate storage device on a communication network may be connected to an apparatus performing an embodiment of the disclosure.

According to the disclosure, when network cooperative communication is used in a wireless communication system, the reliability of terminal reception data/control signals may be improved.

In the above particular embodiments of the disclosure, the components included in the disclosure are expressed in the singular or plural according to the particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

It should be understood that the embodiments of the disclosure described herein should be considered in a descriptive sense only and not for purposes of limitation. That is, it will be understood by those of ordinary skill in the art that various changes in form and details may be made in the embodiments of the disclosure without departing from the scope of the disclosure. Also, the embodiments of the disclosure may be operated in combination when necessary. For example, the base station and the terminal may be operated according to a combination of portions of an embodiment and another embodiment of the disclosure. For example, the base station and the terminal may be operated according to a combination of portions of Embodiment 1 and Embodiment 2 of the disclosure. Also, although the above embodiments of the disclosure are presented based on FDD LTE systems, other modifications based on the technical spirit of the embodiments of the disclosure may also be implemented in other systems such as TDD LTE systems and 5G or NR systems.

Although the present disclosure has been described with various embodiments, various changes and modifications may be suggested to one skilled in the art. It is intended that the present disclosure encompass such changes and modifications as fall within the scope of the appended claims.

What is claimed is:

1. A method by a user equipment (UE) in a wireless communication system, the method comprising:
    receiving a first physical downlink shared channel (PDSCH) transmission associated with a first transmission configuration indicator (TCI) state and a second PDSCH transmission associated with a second TCI state, wherein the first PDSCH transmission and the second PDSCH transmission are associated with a same transport block (TB);
    determining a first transport block size (TBS) of the first PDSCH transmission, wherein a second TBS of the second PDSCH transmission is the same as the determined first TBS; and
    identifying, corresponding to the same transport block, a first low-density parity-check (LDPC) base graph for the first PDSCH transmission based on the determined first TBS and a second LDPC base graph for the second PDSCH transmission based on the second TBS,
    wherein time domain resources for the first PDSCH transmission and time domain resources for the second PDSCH transmission do not overlap each other.

2. The method of claim 1, wherein the first TCI state and the second TCI state are indicated in downlink control information (DCI).

3. The method of claim 1, wherein the first PDSCH transmission and the second PDSCH transmission are received in a same slot.

4. The method of claim 1, wherein a number of symbols of the first PDSCH transmission and a number of symbols of the second PDSCH transmission are same.

5. The method of claim 1, wherein the first TBS is determined based on a number of symbols of the first PDSCH transmission within a slot.

6. The method of claim 1, wherein the second PDSCH transmission is received at least after a number of symbols of the first PDSCH transmission from a start symbol of the first PDSCH transmission.

7. The method of claim 1, wherein the first PDSCH transmission and the second PDSCH transmission are scheduled with a same number of transmission layers in DCI.

8. A user equipment (UE) in a wireless communication system, the UE comprising:
- a transceiver; and
- at least one processor coupled with the transceiver and configured to:
  - receive a first physical downlink shared channel (PDSCH) transmission associated with a first transmission configuration indicator (TCI) state and a second PDSCH transmission associated with a second TCI state, wherein the first PDSCH transmission and the second PDSCH transmission are associated with a same transport block (TB);
  - determine a first transport block size (TBS) of the first PDSCH transmission, wherein a second TBS of the second PDSCH transmission is the same as the determined first TBS; and
  - identify, corresponding to the same transport block, a first low-density parity-check (LDPC) base graph for the first PDSCH transmission based on the determined first TBS and a second LDPC base graph for the second PDSCH transmission based on the second TBS,
  - wherein time domain resources for the first PDSCH transmission and time domain resources for the second PDSCH transmission do not overlap each other.

9. The UE of claim 8, wherein the first TCI state and the second TCI state are indicated in downlink control information (DCI).

10. The UE of claim 8, wherein the first PDSCH transmission and the second PDSCH transmission are received in a same slot.

11. The UE of claim 8, wherein a number of symbols of the first PDSCH transmission and a number of symbols of the second PDSCH transmission are same.

12. The UE of claim 8, wherein the first TBS is determined based on a number of symbols of the first PDSCH transmission within a slot.

13. The UE of claim 8, wherein the second PDSCH transmission is received at least after a number of symbols of the first PDSCH transmission from a start symbol of the first PDSCH transmission.

14. The UE of claim 8, wherein the first PDSCH transmission and the second PDSCH transmission are scheduled with a same number of transmission layers in DCI.

* * * * *